(12) United States Patent
Fernihough et al.

(10) Patent No.: US 11,422,273 B2
(45) Date of Patent: Aug. 23, 2022

(54) SENSOR HOUSING AND SPACER CARRIER ASSEMBLY

(71) Applicant: PGS Geophysical AS, Oslo (NO)

(72) Inventors: Robert Alexis Peregrin Fernihough, Georgetown, TX (US); Lakshmi Subramanian, Austin, TX (US); Andre Stenzel, Sugar Land, TX (US)

(73) Assignee: PGS Geophysical AS, Oslo (NO)

( * ) Notice: Subject to any disclaimer, the term of this patent is extended or adjusted under 35 U.S.C. 154(b) by 328 days.

(21) Appl. No.: 16/556,093

(22) Filed: Aug. 29, 2019

(65) Prior Publication Data

US 2020/0073002 A1 Mar. 5, 2020

Related U.S. Application Data

(60) Provisional application No. 62/727,444, filed on Sep. 5, 2018.

(51) Int. Cl.
*G01V 1/38* (2006.01)
*G01V 1/20* (2006.01)
*G01V 1/16* (2006.01)
*G01V 1/02* (2006.01)
(Continued)

(52) U.S. Cl.
CPC .............. *G01V 1/201* (2013.01); *G01V 1/162* (2013.01); *G01V 1/3843* (2013.01); *G01P 15/09* (2013.01); *G01P 15/18* (2013.01); *G01V 1/159* (2013.01); *G01V 1/3808* (2013.01); *G01V 1/3817* (2013.01); *G01V 2210/32* (2013.01)

(58) Field of Classification Search
CPC ....... G01V 1/201; G01V 1/162; G01V 1/3843
See application file for complete search history.

(56) References Cited

U.S. PATENT DOCUMENTS

| 3,304,534 A | 2/1967 | Sykes |
| 3,970,878 A | 7/1976 | Berglund |
| 4,979,150 A | 12/1990 | Barr |

(Continued)

FOREIGN PATENT DOCUMENTS

| CN | 2814340 | 9/2006 |
| GB | 2493837 | 2/2013 |
| WO | 2016201005 | 12/2016 |

OTHER PUBLICATIONS

International Search Report and Written Opinion in PCT Appl. No. PCT/EP2019/073698 dated Mar. 11, 2020, 22 pages.

(Continued)

*Primary Examiner* — Ian J Lobo

(57) ABSTRACT

Apparatus and techniques are disclosed relating to sensor housing and spacer carrier assemblies. In various embodiments, a spacer carrier provides a cavity through a body of the spacer carrier and a first alignment element positioned at a first end of the cavity. In some embodiments, a sensor housing is configured to be deployed within the cavity through the body of the spacer carrier. The sensor housing may include a housing body configured to receive a sensor and a second alignment element configured to interface with the first alignment element. In various embodiments, the first and second alignment elements are configured to maintain an orientation of the sensor housing within the cavity when the sensor housing is inserted into the spacer carrier.

25 Claims, 20 Drawing Sheets

(51) Int. Cl.
G01P 15/09 (2006.01)
G01P 15/18 (2013.01)

(56) References Cited

U.S. PATENT DOCUMENTS

| | | | |
|---|---|---|---|
| 5,510,577 A * | 4/1996 | Corrigan | H01R 13/523 |
| | | | 174/74 R |
| 5,515,725 A | 5/1996 | Tabota et al. | |
| 5,539,270 A | 7/1996 | Kaji et al. | |
| 5,574,221 A | 11/1996 | Park et al. | |
| 5,789,844 A | 8/1998 | de Groot | |
| 5,877,996 A | 3/1999 | Krokstad et al. | |
| 5,943,293 A * | 8/1999 | Luscombe | G01V 1/201 |
| | | | 367/20 |
| 6,135,969 A | 10/2000 | Hale et al. | |
| 6,530,276 B2 | 3/2003 | Tajika et al. | |
| 6,614,723 B2 * | 9/2003 | Pearce | G01V 1/201 |
| | | | 367/154 |
| 6,619,126 B2 | 9/2003 | Orten | |
| 6,827,597 B1 * | 12/2004 | Metzbower | H01R 13/502 |
| | | | 439/320 |
| 6,879,546 B2 | 4/2005 | Halvorsen et al. | |
| 7,298,672 B1 | 11/2007 | Tenghamn et al. | |
| 7,656,076 B1 | 2/2010 | Pletner et al. | |
| 8,982,662 B2 | 3/2015 | Rouquette et al. | |
| 9,470,806 B2 | 10/2016 | Fernihough | |
| 9,678,235 B2 | 6/2017 | Widmaier et al. | |
| 9,841,317 B2 | 12/2017 | Fernihough | |
| 9,874,647 B2 | 1/2018 | Sudow et al. | |
| 10,175,095 B2 | 1/2019 | Fernihough | |
| 10,197,565 B2 | 2/2019 | Shih et al. | |
| 2002/0015359 A1 | 2/2002 | Joh et al. | |
| 2006/0049715 A1 | 3/2006 | Onishi | |
| 2009/0010101 A1 | 1/2009 | Lunde et al. | |
| 2010/0281979 A1 | 11/2010 | McConnell et al. | |
| 2011/0305108 A1 | 12/2011 | Goujon | |
| 2011/0310698 A1 | 12/2011 | Maples et al. | |
| 2018/0172856 A1 | 6/2018 | Hillesund | |
| 2018/0324507 A1 | 11/2018 | Tenghamn et al. | |

OTHER PUBLICATIONS

Jong-Sub Lee and J. Carlos Santamarina, "Bender Elements: Performance and Signal Interpretation;" pp. 1063-1700, Journal of Geotechnical and Geoenvironmental Engineering, ASCE, Sep. 2005.
International Search Report and Written Opinion in PCT Appl. No. PCT/EP2019/073699 dated Nov. 18, 2019, 14 pages.
Objetsenboisdedavid: "bateau—petite fabrication personnelle en bois de . . . ", Aug. 5, 2007, XP055639479; Retrieved from the Internet: URL:https://objetsenboisdedavid.skyrock.com/1122645154-bateau.html [retrieved on Nov. 6, 2019], the whole document.
Patel, et al., "Performance Analysis of Piezo-Ceramic Elements in Soils," Geotech Geol. Eng. 28, pp. 681-694 (Springer 2010).

* cited by examiner

310

320

1000

```
Align a first orientation of a sensor relative to a first alignment
element on a sensor housing, where the sensor housing
includes a housing body configured to receive the sensor
1002
```
↓
```
Mount the sensor on a first annular step within the housing
body of the sensor housing such that the sensor and the sensor
housing maintain the first orientation
1004
```
↓
```
Position the sensor housing within a cavity in a body of a
spacer carrier, where the spacer carrier includes a second
alignment element that is configured to interface with the first
alignment element on the sensor housing to maintain a second
orientation of the sensor housing relative to the spacer carrier
1006
```
↓
```
Affix the sensor housing within the cavity in the body of the
spacer carrier
1008
```

```
Detect, by a particle motion sensing element, particle motion, where the detecting
is performed during a time interval in which the particle motion sensing element
experiences a rotational acceleration, where the detecting includes:
1102
```

```
Receiving, from a first bender element, a
first signal based on a flexing of the first
bender element in a first direction
1104
```

```
Receiving, from a second bender element,
a second signal based on a flexing of the
second bender element in a second
direction opposite of the first direction
1106
```

```
Combining the first and second signals
such that at least a portion of the first and
second signals cancel
1108
```

```
Recording signals indicative of the particle
motion detected by the particle motion
sensing element
1110
```

FIG. 11

SENSOR HOUSING AND SPACER CARRIER ASSEMBLY

CROSS-REFERENCE TO RELATED APPLICATIONS

This application claims the benefit of U.S. Provisional Application No. 62/727,444, filed on Sep. 5, 2018, which is hereby incorporated by reference as if entirely set forth herein.

BACKGROUND

Geophysical surveys are often used for oil and gas exploration in geological formations, which may be located below marine environments. Seismic surveys, for example, are based on the use of acoustic waves. In seismic surveys, a survey vessel may tow one or more signal sources (e.g., air guns, vibratory signal sources, etc.) and a plurality of streamers along which a number of sensors (e.g., hydrophones, geophones, etc.) are located. Acoustic waves generated by the source(s) may be transmitted to the earth's crust and then reflected back and captured at the sensors. Data collected during a marine geophysical survey may be analyzed to locate hydrocarbon-bearing geological formations, and thus determine where deposits of oil and natural gas may be located.

The quality of the data collected during a seismic survey may be degraded, however, due to destructive interference from waves that have reflected off of the water-air interface at the surface of the marine environment. The detrimental effect of these reflections from the water-air interface (referred to as "ghost signals") may be mitigated by combining signals from multiple sensor types that are sensitive to different physical characteristics of the acoustic wave. For example, combining the output of a hydrophone (sensitive to changes in pressure associated with the acoustic wave) with the output from a sensor that is capable of detecting changes in the velocity of particles due to the acoustic wave (such as a geophone) may enable the distortion from the ghost signal to be mitigated.

Particle motion sensing element measurements may be influenced by rotational movement (e.g., of the streamer in which they are incorporated). Further, particle motion sensing elements deployed in streamers may routinely be exposed to mechanical stresses.

BRIEF DESCRIPTION OF THE DRAWINGS

FIG. 10 is a flow diagram illustrating an example method for manufacturing a sensor assembly, according to some embodiments.

FIG. 11 is a flow diagram illustrating an example method for detecting particle motion, according to some embodiments.

Figure 1:
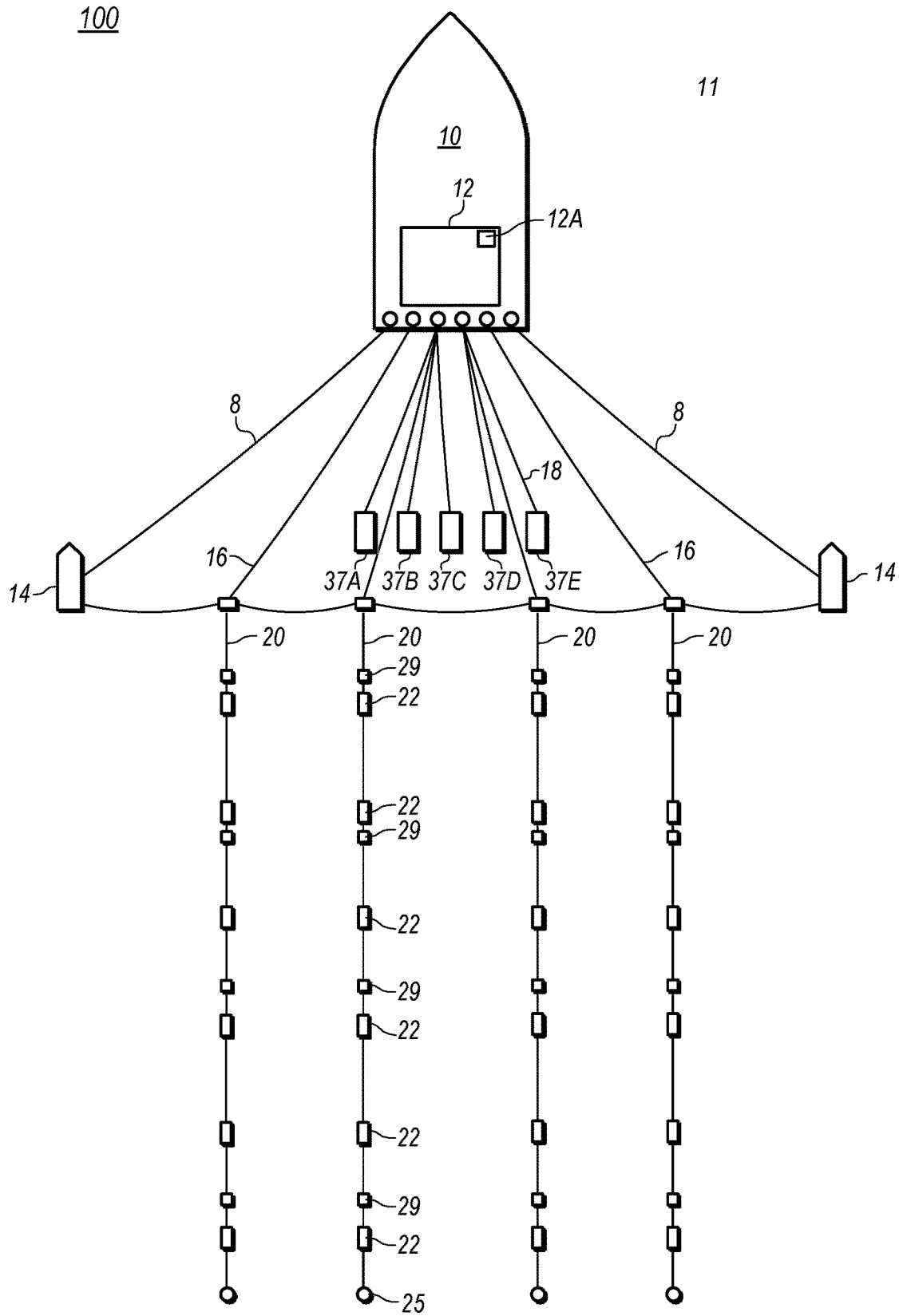
FIG. 1 is a block diagram illustrating an example geophysical survey system, according to some embodiments.

This disclosure includes references to "one embodiment," "a particular embodiment," "some embodiments," "various embodiments," "an embodiment," etc. The appearances of these and similar phrases do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. "Control equipment configured to activate a signal source," for example, is intended to cover equipment that has circuitry that performs this function during operation, even if the circuitry in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. The term "configured to" is not intended to mean "configurable to." An unprogrammed FPGA, for example, would not be considered to be "configured to" perform some specific function, although it may be "configurable to" perform that function after programming. Reciting in the appended claims that a structure is "configured to" perform one or more tasks is expressly intended not to invoke 35 U.S.C. § 112(f) for that claim element.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the context clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected.

As used herein, the term "based on" is used to describe one or more factors that affect a determination. This term does not foreclose the possibility that additional factors may also affect the determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may also affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. When used in the claims, the term "or" is used as an inclusive or and not as an exclusive or. For example, the phrase "at least one of x, y, or z" means any one of x, y, and z, as well as any combination thereof (e.g., x and y, but not z).

Although specific embodiments are described below, these embodiments are not intended to limit the scope of the present disclosure, even where only a single embodiment is described with respect to a particular feature. Examples of features provided in the disclosure are intended to be illustrative rather than restrictive unless stated otherwise. The below description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

FIG. 1 is a block diagram illustrating a geophysical survey system 100, according to some embodiments. In various embodiments, survey system 100 is configured to acquire geophysical data corresponding to geological structures disposed below a body of water. In the illustrated embodiment, system 100 includes survey vessel 10, which tows signal sources 37, streamers 20, and paravanes 14. In other embodiments, at least a portion of streamers 20 may be towed by a second survey vessel (not shown), in place of or in addition to survey vessel 10. Similarly, in some embodiments, at least a portion of signal sources 37 may be towed by one or more additional survey vessels (not shown), in place of or in addition to survey vessel 10.

In survey system 100, survey vessel 10 is shown towing five signal sources 37A-37E (referred to collectively as "sources 37" or "signal sources 37") using source cables 18. In various embodiments, however, survey vessel 10 may tow any appropriate number of signal sources, including as few as none (e.g., when sources are towed by another vessel) or as many as six or more. In various embodiments, signal sources 37 may include any of various suitable types of signal sources, such as air guns, vibratory signal sources, bender sources, etc. In some embodiments, one or more of signal sources 37 may be vibratory signal sources that are configured to be driven according to a given function by control equipment 12.

Survey vessel 10 includes equipment, shown generally at 12 and, for convenience, collectively referred to as "control equipment." Control equipment 12 may include devices such as a data recording unit (not shown separately) for making a record with respect to time of signals generated by various geophysical sensors 22 in the system 100. Control equipment 12 may also include navigation equipment (not shown separately), which may be configured to control, determine, and record, at selected times, the geodetic positions of: survey vessel 10, each of a plurality of geophysical sensors 22 disposed at locations in streamers 20, and signal sources 37. Geodetic position may be determined using various devices, including global navigation satellite systems such as the global positioning system (GPS), for example. In the illustrated embodiment, survey vessel 10 includes geodetic positioning device 12A. Additional positioning devices may be placed at various locations on streamers 20 in some embodiments. In some embodiments, control equipment 12 is configured to control sources 37, e.g., to control when the sources 37 activate, where the sources 37 are positioned, the manner in which the sources 37 are activated, etc. Note that, although control equipment 12 is shown on survey vessel 10, this embodiment is provided merely as an example and is not intended to limit the scope of the present disclosure. In various embodiments, various components of control equipment 12, or the entirety of control equipment 12, may alternatively be located on a separate vessel (not shown) or at a remote location as desired.

Control equipment 12, in various embodiments, includes a computing system configured to, inter alia, process sensor outputs from geophysical sensors 22. In other embodiments, a computing system at another location may process geophysical data gathered by geophysical survey system 100 (e.g., on land after a survey has been conducted). A computing system may include or be configured to access a non-transitory, computer-readable storage medium having instructions stored thereon that are executable to perform various operations described herein in order to conduct a survey or process sensor outputs generated during a survey. A computing system may include one or more processors configured to execute the program instructions to cause a system to perform various functionality described herein.

In FIG. 1, survey vessel 10 tows four streamers 20 using lead-in cables 16. In various embodiments, however, survey vessel 10 may tow any appropriate number of streamers, including as few as none (e.g., when streamers are towed by another vessel) or as many as 26 or more. In various embodiments, streamers 20 may include any of various appropriate modules in addition to geophysical sensors 22. In geophysical survey systems that include a plurality of laterally spaced-apart streamers, such as system 100, streamers 20 are typically coupled to towing equipment that secures the forward end of each of streamers 20 at a selected lateral position with respect to adjacent streamers and with respect to survey vessel 10. For example, as shown in FIG. 1, the towing equipment may include two paravanes 14 coupled to survey vessel 10 via paravane tow ropes 8. In the illustrated embodiment, paravanes 14 are the outermost components in the streamer spread and may be used to provide lateral streamer separation. In some embodiments, survey vessel 10 may be configured to tow different streamers 20 at different depths or different lateral displacements from a centerline of survey vessel 10. In FIG. 1, streamers 20 further include birds 29, which are steering devices configured to maintain streamers 20 in a desired position (e.g., at a specified depth or lateral displacement). Similarly, steering devices may be used to facilitate positioning of sources 37. In some embodiments, survey vessel 10 may be configured to tow streamers 20 using various geometries such as different feather angles, depth profiles etc. In some embodiments, streamers 20 may include multiple geodetic positioning devices (not shown). In some embodiments, streamers 20 include tail buoys 25.

Streamers 20 may include any of various suitable types of sensors 22, including hydrophones, geophones, accelerometers, particle motion sensing elements, inclinometers, magnetometers, temperature sensors, or any suitable combination thereof, as non-limiting examples. In various implementations of the disclosure, sensors 22 may measure, for example, seismic field energy indicative of the response of various structures in the Earth's subsurface formation below the bottom of body of water 11 to energy imparted into the subsurface formation by one or more of signal sources 37. Seismic energy, for example, may originate from signal sources 37 deployed in body of water 11 and towed by survey vessel 10. In various embodiments, streamers 20 may include hydrophones configured to detect changes in pressure due to acoustic waves. As noted above, in various instances, acoustic waves may reflect from the water-air interface of the surface and be detected at sensors 22 in the streamers 20, causing degradation of the desired geophysical data from acoustic waves reflected from subsurface formations. To mitigate the effects of such "ghost signals," one may combine the output of the hydrophones with the output of sensors that are capable of detecting changes in fluid particle motion due to the received acoustic waves, such as geophones. By appropriately combining the seismic trace data of a hydrophone and a (co-located or nearby) geophone, the destructive interference caused by the ghost wave may be mitigated in a process known as "de-ghosting." Thus, in various embodiments, it is desirable to include, within streamer 20, sensors that are capable of detecting particle velocity or some indicator thereof.

Utilizing geophones for this purpose may present various disadvantages, however. For example, gimballed geophones are complex and expensive devices, adding significant expense to the cost of performing a geophysical survey. Further, using prior, non-gimballed particle motion sensing elements, while cheaper, may also present various technical problems. For instance, such particle motion sensing elements may be susceptible to noise due to rotational acceleration of the streamer 20 (e.g., in the area in which such a particle motion sensing element is deployed). This rotational noise may introduce an unacceptable amount of noise into the data, thereby degrading the quality of the seismic data collected during the seismic survey.

In various embodiments, a two-axis sensing element is disclosed that is configured to detect linear fluid particle accelerations associated with received acoustic waves. This acceleration data may then be used to determine the corresponding fluid particle velocities, for example by taking the integral of the acceleration data as a function of time (either as the acceleration data is being captured (e.g., in real-time or near real-time) or at some subsequent time after the acceleration data has been gathered (e.g., during post-processing of the data)). As described above, this particle velocity data may be used in the de-ghosting process to mitigate (and, in some instances, remove entirely) the degrading effects of reflections from the water-air interface. Additionally, in various embodiments, the disclosed two-axis sensing element is configured to cancel noise that would otherwise be induced by rotational acceleration of the sensing element. For example, as described in more detail below with reference to FIGS. 5A-5B, a two-axis sensing element may include pairs of piezoelectric bender elements, where each bender element in the pair is spaced symmetrically around a central axis of the sensing element. Accordingly, as the two-axis sensing element rotates, the instantaneous stresses induced in each pair of bender elements displace equal and opposite complimentary charges that cancel, mitigating (or, in some instances, eliminating entirely) noise due to rotational acceleration of the two-axis sensing element. This may result in survey data in which the signal-to-noise ratio is substantially improved, which, in turn, may improve the quality of the images generated from such data.

Further note that, in various embodiments, streamers 20 may be subjected to extreme conditions in the course of operation. For example, during deployment, a streamer 20 is often exposed to large mechanical strains, causing the sensors contained therein to also be exposed to large, instantaneous impulses. In various embodiments, the disclosed sensor housing and spacer carrier are configured to deploy sensors, such as a two-axis sensing element or any other suitable sensor, in a manner that is capable of withstanding severe deployment and operational conditions, as explained in more detail below.

Figure 2:
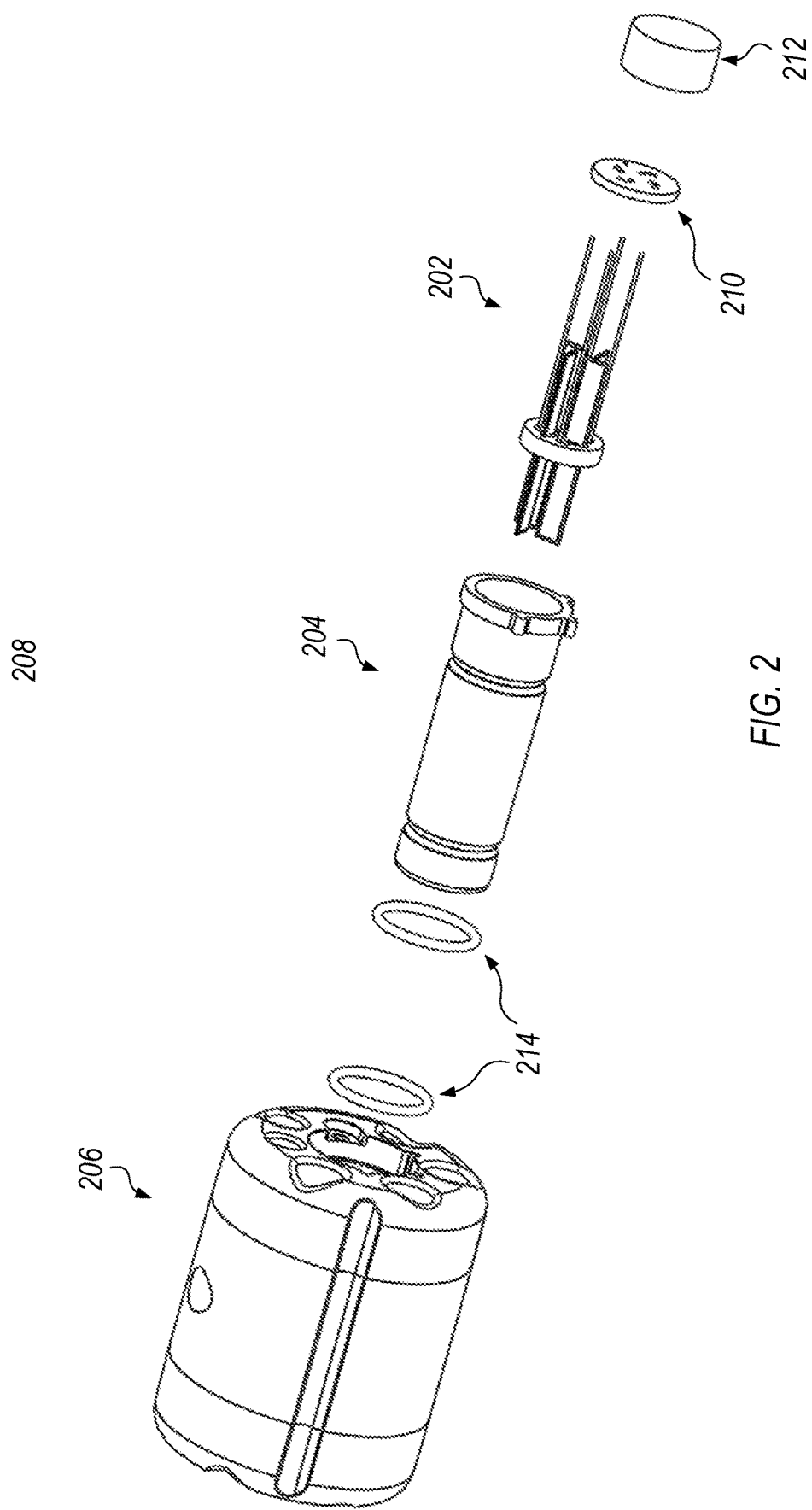
FIG. 2 is a diagram illustrating an example two-axis sensing element, sensor housing, and spacer carrier, according to some embodiments.

FIG. 2 includes a block diagram that illustrates an exploded, perspective view of a two-axis sensing element 202, a sensor housing 204, and a spacer carrier 206, according to some embodiments. In various embodiments, two-axis sensing element 202 may be mounted within the sensor housing 204, which in turn may be mounted within the spacer carrier 206 to create a sensor assembly 208, as described below in more detail. In various embodiments, multiple sensor assemblies 208 may be deployed within a seismic streamer 20 for use in a geophysical survey. In various embodiments, the sensor assembly 208 shown in FIG. 2 may be used to detect particle motion in two-axes caused, for example, by a passing soundwave generated during a seismic survey while mitigating noise due to rotation of the sensor assembly 208. (Note that, in the following description of FIG. 2, various structural elements of two-axis sensing element 202, sensor housing 204, and spacer carrier 206 are introduced. These structural elements are then discussed in more detail in the description of FIGS. 3-9, in which specific reference numerals for these structural elements are provided.)

As shown in FIG. 2, two-axis sensing element 202 may be mounted within the sensor housing 204, as discussed in detail with reference to FIGS. 7A-7B. Once the two-axis sensing element 202 is mounted within the housing body 602 of sensor housing 204, a capping element 210 may then be mounted into the housing body 602 behind the two-axis sensing element 202. In various embodiments, capping element 210 effectively caps the sensor housing 204 and provides an electrical feed through of the electrical connections from the two-axis sensing element 202 to the appropriate data acquisition channels in the streamer 20 outside of the sensor assembly 208. As discussed in more detail below, in various embodiments the capping element 210 may be mounted within the housing body 602 of the sensor housing 204 such that there is a void between the outside surface of the capping element 210 and the mouth 605 of the sensor housing 204. In various embodiments, this void may be viewed as a "potting cup" that may be filled with a potting compound 212 (e.g., a polyurethane resin sealant or any other suitable potting compound) to create a water-tight seal of the two-axis sensing element 202 within the sensor housing 204.

As described in more detail below with reference to FIGS. 3A-3E, two-axis sensing element 202 utilizes piezoelectric bender elements 302 to detect particle acceleration. That is, in various embodiments, two-axis sensing element 202 may be used to sense accelerations in two perpendicular axes that lie in the plane that is perpendicular to a longitudinal axis of streamer 20 in which the two-axis sensing element 202 is disposed. Additionally, in various embodiments, two-axis sensing element 202 is configured to mitigate signal noise caused by rotational movement of the sensor assembly 208. For example, during the course of a seismic survey, a streamer 20 in which the sensor assembly 208 is deployed may be exposed to turbulence within the water column, which may cause the two-axis sensing element 202 to rotate about its longitudinal axis. In prior systems, such rotation of the streamer may generate signal noise, thereby degrading the signal-to-noise ratio of the geophysical data gathered during the survey. As described in more detail below, however, two-axis sensing element 202 is configured to mitigate such rotational noise, thereby improving the quality of geophysical data products generated from the seismic surveying process, according to various embodiments.

Sensor housing 204 is described in more detail below with reference to FIGS. 6A-6B. In various embodiments, sensor housing 204 includes a hollow housing body 602 that is configured to receive the two-axis sensing element 202. For example, in some embodiments, the sensor housing 204 includes an annular step 702 onto which the two-axis sensing element 202 may be mounted. Further, as shown in FIG. 2, sensor housing 204 includes an alignment element 606 at the mouth 605 of the sensor housing 204. In some embodiments, this alignment element 606 may be used while mounting the two-axis sensing element 202 within the housing body 602 to ensure that the two-axis sensing element 202 is mounted at the desired orientation. Further, in some embodiments, the alignment element 606 from the sensor housing 204 may be configured to mate with a corresponding alignment element 904 located on the spacer carrier 206, which may maintain an orientation of the sensor housing 204 within the cavity 902 of the spacer carrier 206 whenever the sensor housing 204 is inserted into the cavity 902. For example, in some embodiments, this alignment element 606 may include one or more raised nodes on a periphery of the mouth 605 of the sensor housing 204.

In various embodiments, the sensor housing 204 is mounted within a cavity 902 in the spacer carrier 206. As shown in FIG. 2, the external surface of the sensor housing 204 includes two grooves, which are configured to receive O rings 214. Once the O rings 214 are placed within the grooves on the external surface of the sensor housing 204, the sensor housing 204 may then be placed within the cavity 902. In such embodiments, the sensor housing 204 is supported, on an inner wall of the cavity 902, by the O rings 214 such that the housing body 602 of the sensor housing 204 is not in direct physical contact with the inner wall of the cavity 902. As such, in various embodiments, a physical gap exists between the external surface of the sensor housing 204 and the inner surface of the spacer carrier 206, which may provide various improvements to the operation of the sensor assembly 208. For example, when, during deployment, sensor assembly 208 is exposed to a large mechanical stress (e.g., a crush load is applied to the spacer carrier 206), that stress may be relieved through compression of the O rings 214 and the partial closing of the gap that exists between the sensor housing 204 at the spacer carrier 206, rather than as a static displacement being transferred to the sensor housing 204 and the two-axis sensing element 202.

Figure 3A:
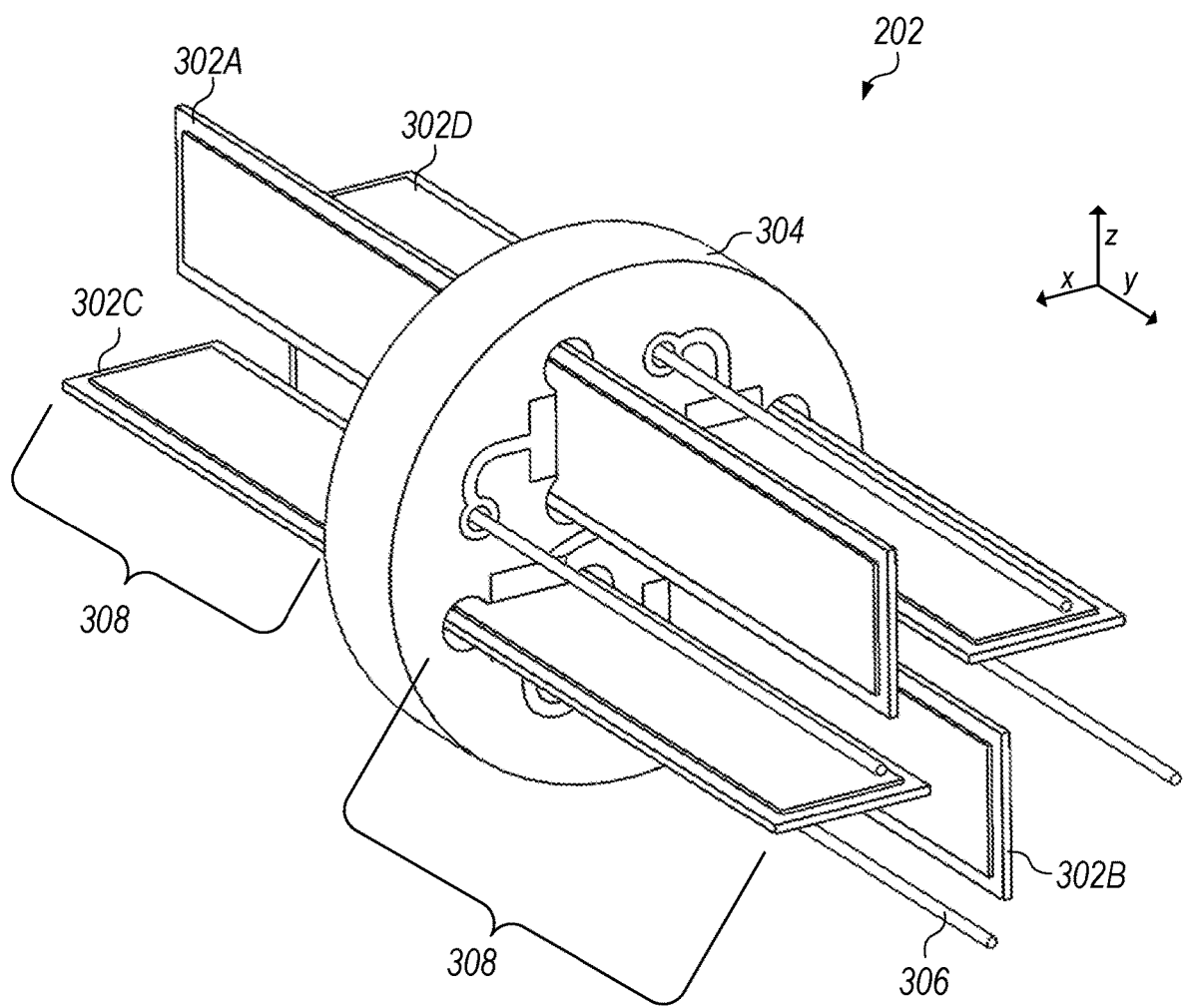
FIG. 3A is a diagram illustrating an example two-axis sensing element, according to some embodiments.

With reference to FIGS. 3A-3E, the structure of two-axis sensing element 202 is described, according to some embodiments. Turning to FIG. 3A, block diagram 300 depicts a perspective view of two-axis sensing element 202, according to some embodiments. Note that, in various embodiments, two-axis sensing element 202 may also be referred to as a "particle motion sensing element," a "particle motion sensor," or a "two-axis accelerometer." In the depicted embodiment, two-axis sensing element 202 includes a mounting plate 304 through which two pairs of bender elements 302 are mounted. For example, in the depicted embodiment, the first pair of bender elements includes bender elements 302A and 302B, and the second pair of bender elements includes bender elements 302C and 302D.

In various embodiments, the pairs of bender elements 302 are mounted such that both bender elements in the pair are oriented in the same direction. For example, as shown in FIG. 3A, mounting plate 304 includes two pairs of mounting slots through the mounting plate 304. In the depicted embodiment, two of these mounting slots are oriented in a vertical direction (e.g., in the z-direction, in FIG. 3A) and two of these mounting slots are oriented in a horizontal direction (e.g., in the x-direction, in FIG. 3A). In various embodiments, the bender elements 302 are placed through these mounting slots such that the mounting plate 304 transects each of the bender elements 302 into two cantilever portions 308. As described in more detail below with reference to FIG. 3B, each of the bender elements 302 may include a substrate element at its center with piezoelectric elements attached to both the top and bottom sides of the substrate element. As the two-axis sensing element 202 is exposed to particle acceleration (e.g. due to reflected seismic signals from the subsurface or from the water-air interface), this particle motion may cause deflection in one or more of the pairs of bender elements 302. This physical deflection or "flexing" may cause a mechanical stress to be induced in the piezoelectric element, which, in turn, may cause the bender elements 302 to generate an electrical signal that is proportionate to the magnitude of the acceleration.

For example, consider an embodiment in which the two-axis sensing element 202 is deployed as shown in FIG. 3A such that bender elements 302C and 302D are oriented parallel to the x-axis of FIG. 3A. In such an embodiment, when the two-axis sensing element 202 is exposed to an acceleration in the positive z-direction (that is, in a direction perpendicular to the orientation of bender elements 302C and 302D) this acceleration may cause bender elements 302C and 302D to flex such that the ends of the bender elements 302C and 302D are displaced in the negative z-direction, while bender elements 302A and 302B do not flex. This bending of bender elements 302C and 302D, in turn, may cause the piezoelectric element on the bottom side of bender elements 302C and 302D to go into compression, while the piezoelectric elements on the top sides of bender elements 302C and 302D go into tension. In various embodiments, the bending of bender elements 302C and 302D may cause the two-axis sensing element 202 to generate a net charge displacement that manifests itself as an output signal that is proportionate to the z-component of the displacement of the bender elements 302C and 302D.

Note that, although two-axis sensing element 202 includes two pairs of bender elements 302 in FIG. 3A, this is not intended to limit the scope of the present disclosure. In some embodiments, sensing element 202 may include additional or fewer bender elements 302. For example, in some embodiments, the sensing element 202 may include a single bender element 302 for each sensing axis. In such an embodiment, the bender elements 302 may be longitudinally offset from one another and centered within their respective mounting plates of the sensing element 202. In other embodiments, sensing element 202 may include additional pairs of bender elements 302 oriented in one or more additional directions.

Figure 3B:
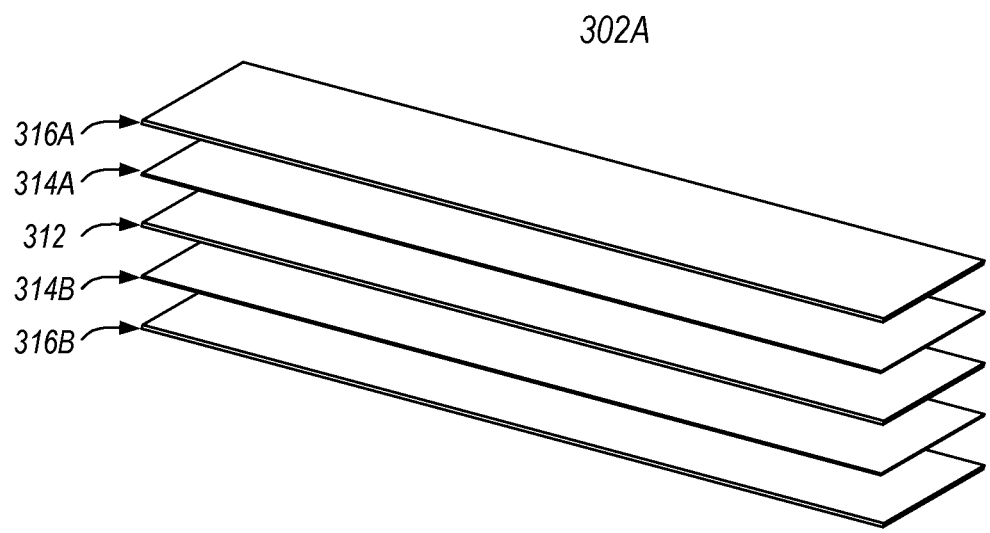
FIGS. 3B-3C are block diagrams illustrating an example bender element, according to some embodiments.

In FIG. 3B, block diagram 310 depicts an exploded, perspective view of bender element 302A, according to some embodiments. In the depicted embodiment, bender element 302A includes a substrate element 312 located at its center. Substrate element 312 may be constructed from various suitable materials, according to different embodiments. For example, in some embodiments, substrate element 312 may be constructed from brass, copper, or any of various other suitable metallic materials. Additionally, in some embodiments, substrate element 312 may be constructed from a non-metallic material. As shown in FIG. 3B, bender element 302A further includes piezoelectric elements 316A and 316B attached to a top surface and a bottom surface of the substrate element 312. In the depicted embodiment, the piezoelectric elements 316 are connected to the substrate element 312 through use of an adhesive, as depicted by the adhesive layers 314A and 314B in FIG. 3B. Stated differently, in the depicted embodiment, bender element 302A includes a first piezoelectric element 316A attached to a first side of the substrate element 312 using an adhesive layer 314A and a second piezoelectric element 316B attached to a second, opposite side of the substrate element 312 using an adhesive layer 314B.

As will be appreciated by one of skill in the art with the benefit of this disclosure, piezoelectric materials exhibit the piezoelectric effect in which the material generates an electric charge when subjected to mechanical stress. Thus, when a piezoelectric element 316 is subjected to mechanical stress (e.g., by bending), the piezoelectric element 316 may generate a corresponding electric charge in response. In some embodiments, piezoelectric elements 316 may be constructed from a ceramic piezoelectric material, such as lead titanate zirconate (PZT). One non-limiting example of such a material is APC 850, from APC International, Ltd. Other piezoelectric materials, for example, barium titanate (BaTiO$_3$), lead titanate (PbTiO$_3$), zinc oxide (ZnO), sodium potassium niobite ((KNa)NbO$_3$), bismuth ferrite (BiFeO$_3$), sodium niobate (NaNbO$_3$), bismuth titanate (Bi$_4$Ti$_3$O$_{12}$), sodium bismuth titanate (Na$_{0.5}$Bi$_{0.5}$TiO$_3$), berlinite (AlPO$_4$), barium sodium niobate (Ba$_2$NaNb$_5$O$_{15}$), lead potassium niobate (Pb$_2$KNb$_5$O$_{15}$), quartz, Rochelle salt or plastic piezoelectric materials such as polyvinylidene fluoride (PVDF) may be used in alternative embodiments of piezoelectric element 316. Adhesive layers 314 may be any of various adhesives. One non-limiting example epoxy adhesive that may be used in an embodiment of bender element 302A is LOCTITE® E-30CL epoxy structural adhesive from Henkel Corporation. Note that, in alternative embodiments of bender elements 302, adhesive layers 314 may be omitted, in some embodiments, substrate element 312 may be omitted, and, in still other alternative embodiments, both adhesive layers 314 and substrate element 312 may be omitted.

Figure 3C:
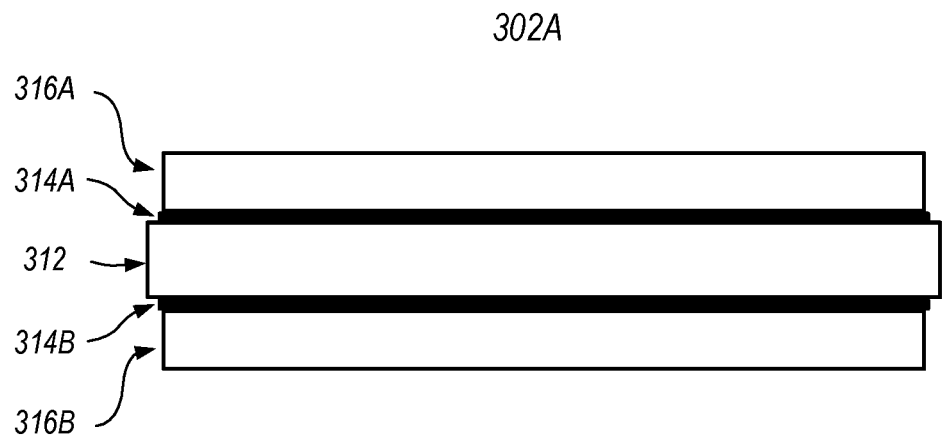

In FIG. 3C, block diagram 320 shows a side elevation view of an assembled bender element 302A, according to some embodiments. As shown in FIG. 3C, bender element 302A includes a piezoelectric element 316A attached to the substrate element 312 by adhesive layer 314A. Further, as shown in FIG. 3C, bender element 302A includes the piezoelectric element 316B attached to a second, opposite side of the substrate element 312 by adhesive layer 314B. In various depicted embodiments, each of the piezoelectric elements 316 and substrate elements 312 are shown as having a substantially rectangular cross-section. Note, however, that these embodiments are provided merely as examples and are not intended to limit the scope of the present disclosure. In other embodiments, various other suitable shapes for piezoelectric elements 316 or substrate elements 312 may be used, as desired.

In various embodiments described above, bender elements 302 have been described as including a substrate element 312 to which the piezoelectric elements 316 are attached. As will be appreciated by one of skill in the art with the benefit of this disclosure, such a configuration of bender element 302 may be referred to as a "trimorph." Note, however, that such embodiments are provided merely as examples and are not intended to limit the scope of the present disclosure. For example, in other embodiments, bender elements 302 may omit substrate element 312 and may be instead constructed from two piezoelectric elements 316 connected to one another (e.g., using an adhesive or other suitable technique). In still other embodiments, bender elements 302 may include a single piezoelectric element 316 attached to a substrate element 312. As will be appreciated by one of skill in the art with the benefit of this disclosure, such a configuration of bender element 302 may be referred to as a "bimorph."

Figure 3D:
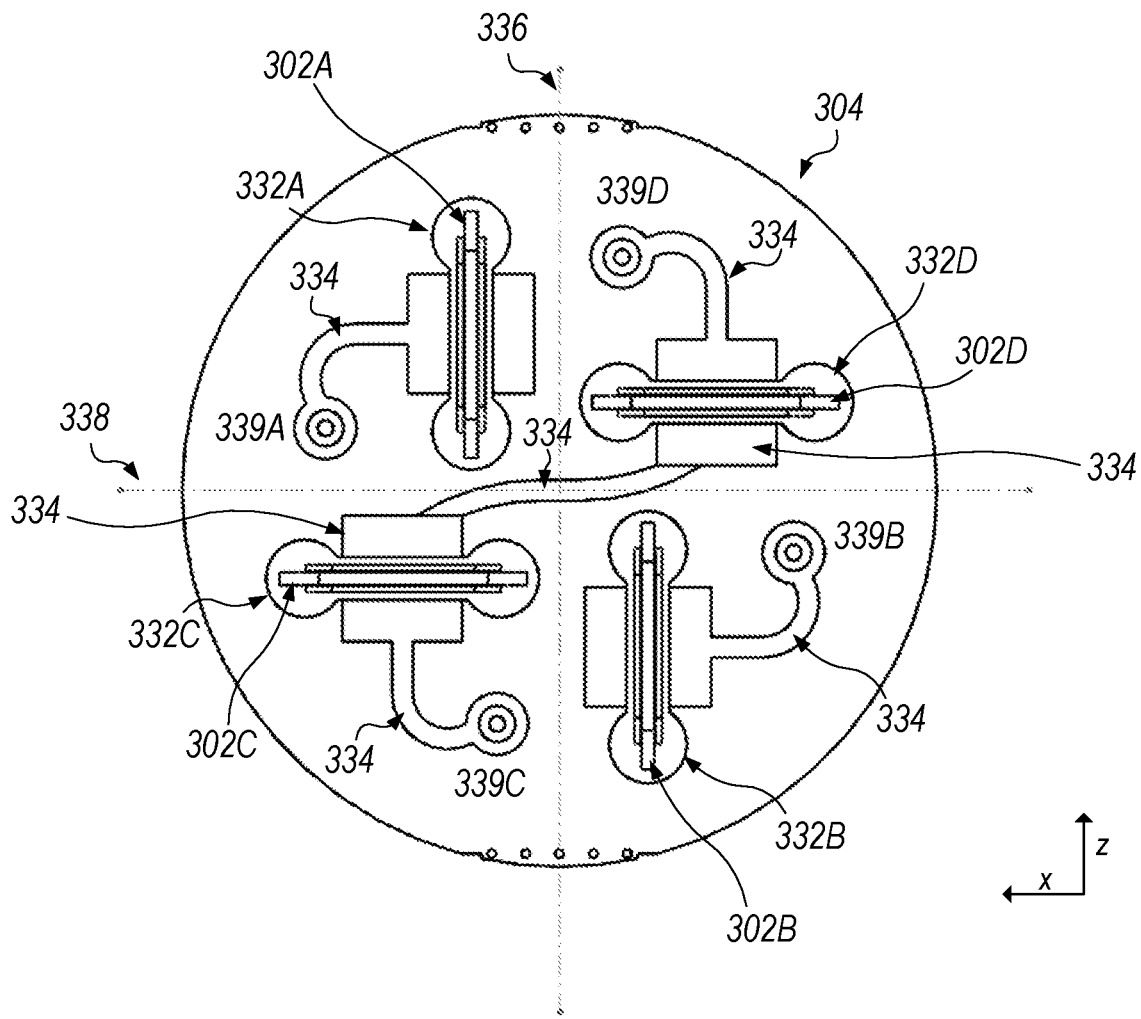
FIGS. 3D-3E are diagrams illustrating an example mounting plate, according to some embodiments.
Figure 3E:
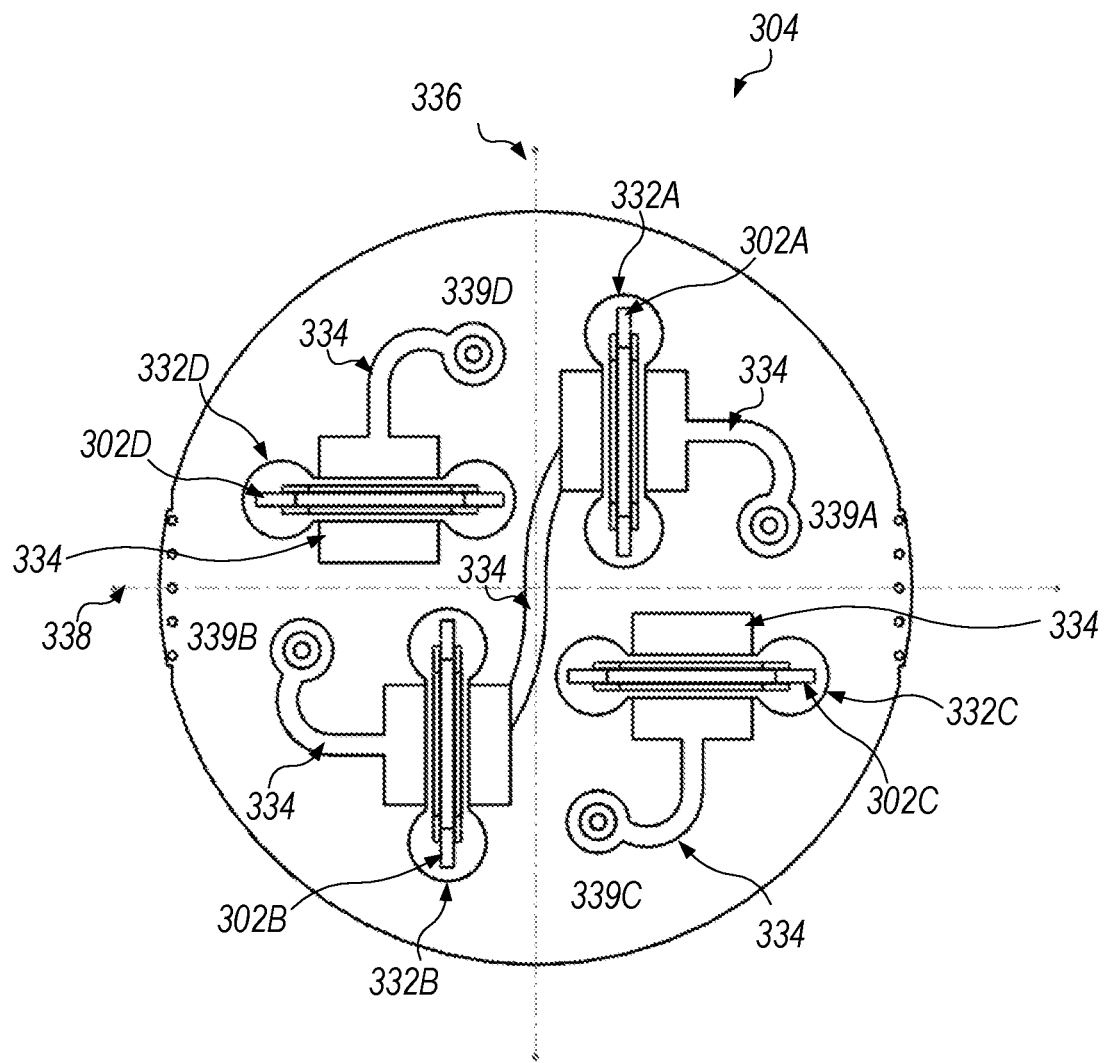

Referring now to FIGS. 3D and 3E, block diagrams 330 and 340 depict additional detail of a mounting plate 304 that may be used in two-axis sensing element 202, according to some embodiments. In various embodiments, mounting plate 304 is a printed circuit board, which may be constructed from FR-4 or any of various other suitable materials. In other embodiments, mounting plate 304 may be constructed as an injection-molded component. For example, in such embodiments, mounting plate 304 may be constructed by injection molding around plates that are inserted into a mold tool with wires directly soldered to the bender elements 302. With reference to FIG. 3D, diagram 330 shows a front elevation view of the two-axis sensing element 202. As shown in FIG. 3D, mounting plate 304 includes two pairs of mounting slots 332. More specifically, mounting plate 304 includes a first pair of mounting slots 332A and 332B through which bender elements 302A and 302B are mounted, and a second pair of mounting slots 332C and 332D through which bender elements 302C and 302D are mounted. In the depicted embodiment, mounting slots 332 (and the bender elements 302 mounted there through) are arranged in an "offset cross" configuration. That is, as shown in diagram 330, mounting slots 332A and 332B are offset from one another relative to a first axis 336 through the center of the mounting plate in the z-direction. Further, mounting slots 332A and 332B are also offset from one another relative to a second axis 338 in the x-direction. Similarly, mounting slots 332C and 332D are offset from one another relative to the second axis 338 through the center of the mounting plate in the x-direction and are offset from one another relative to the first axis 336 through the center of the mounting plate 304 in the z-direction.

Note, however, that this embodiment is provided merely as an example and is not intended to limit the scope of the present disclosure. For example, in other embodiments, various other suitable arrangements of the mounting slots 332 (and, therefore, the bender elements 302 when mounted within the mounting slots 332) may be used, as desired. For example, in some embodiments, the mounting slots 332 may be arranged in a "cross" configuration in which the first pair of mounting slots 332A and 332B are aligned along the first axis 336 and the second pair of mounting slots 332C and 332D are aligned along the second axis 338. In other embodiments, the mounting slots 332 may be arranged in a "square" configuration in which both of the first pair of mounting slots 332A and 332B are positioned parallel to the first axis 336, with mounting slot 332A offset to one side of the first axis 336 and mounting slot 332B offset to the other side of the first axis 336. Further, in this "square" configuration, both of the second pair of mounting slots 332C and 332D are positioned parallel to the second axis 338, with mounting slot 332C offset to one side of the second axis 338 and mounting slot 332D offset to the other side of the second axis 338.

As shown in FIG. 3D, mounting plate 304 includes conducting traces 334 used to electrically connect the mounting slots 332 to corresponding holes 339 and to electrically connect pairs of mounting slots 332 to one another. For example, in the depicted embodiment, mounting plate 304 includes four holes 339 into which wires may be soldered (or otherwise electrically connected) to connect the two-axis sensing element 202 to other components located elsewhere in the streamer 20. Further, in various embodiments, the mounting slots 332 are plated through-holes in which the bender elements 302 may be mounted. For example, in various embodiments, bender elements 302 are mechanically secured within the mounting slots 332 using solder joints, which, in turn, enables the electrical connection of the bender elements 302 to the conducting traces 334 at the mounting slots 332. Note, however, that in some embodiments, bender elements 302 may be attached to the mounting plate 304 in the mounting slots 332 using a conductive epoxy. In the embodiment shown in FIG. 3D, a conducting trace 334 electrically connects mounting slots 332C and 332D (and, therefore, bender elements 302C and 302D). Referring to FIG. 3E, block diagram 340 shows a back-elevation view of the two-axis sensing element 202. As shown in block diagram 340, mounting plate 304 includes, on its back surface, a conducting trace to electrically connect mounting slots 332A and 332B (and, therefore, bender elements 302A and 302B mounted therein). Various configurations for connecting a pair of bender elements 302 to one another will be described in more detail below with reference to FIGS. 4E-4H.

Note that, in various embodiments, the piezoelectric elements 316 include metalized electrode surfaces deposited on the exterior of the piezoelectric elements 316 that are used as electrodes. These metalized electrode surfaces may be constructed from various suitable materials. For example, in some embodiments, the electrodes of piezoelectric elements 316 may be made from fired silver, nickel, gold, etc. and applied to the piezoelectric elements 316 in electrode patterns (e.g., through a silk-screen process). In various embodiments, bender elements 302 are mechanically attached and electrically connected to the mounting slots 332 by soldering the plated through-holes of the mounting slots 332 to this electrode layer of the bender elements 302. As will be appreciated by one of skill in the art with the benefit of this disclosure, the piezoelectric material used to construct piezoelectric elements 316 may have an associated polarization. For example, to polarize a piezoelectric material, one may apply an electric field to the material while it is at an elevated temperature, allowing the material to then cool in the presence of the electric field. In various embodiments, the electrode of the piezoelectric material to which the positive potential was applied may be referred to as the "positive electrode" and, similarly, the electrode to which negative potential was applied may be referred to as the "negative electrode."

Figure 4A:
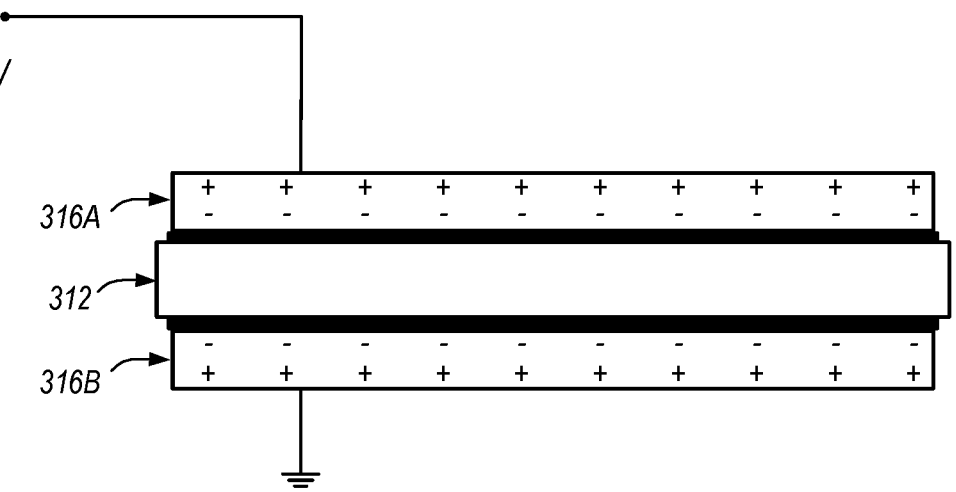
FIGS. 4A-4B are diagrams illustrating an example bender element in which the piezoelectric elements are connected in series, according to some embodiments.

In various embodiments, the orientation in which the piezoelectric elements 316 are connected to one another, with reference to their polarity, within a bender element 302 may vary, according to different embodiments of the present disclosure. For example, depending on the relative orientation of the piezoelectric elements 316, it is possible to electrically connect the piezoelectric elements 316 in a bender element 302 either in series or in parallel. Referring to FIG. 4A, for example, diagram 400 depicts an embodiment of a bender element, bender element 402, in which the piezoelectric elements 316A and 316B are connected in series. In the embodiment depicted in FIG. 4A, the negative electrode of each of piezoelectric elements 316A and 316B are attached to the substrate element 312. Stated differently, in the series-type configuration, the positive electrodes of piezoelectric elements 316A and 316B are exposed on each side of the bender element 402. In such embodiments, when the bender element 402 flexes, current flows into whichever piezoelectric element 316 is in planar compression and out of whichever piezoelectric element 316 is in planar tension. In bender element 402, the piezoelectric elements 316 are effectively physically flipped relative to one another and, when flexing of the bender element 402 occurs, the stresses induced in each of the piezoelectric elements 316 are equal and opposite from one another. As such, electrically connecting the piezoelectric elements 316A and 316B in series, as shown in FIG. 4A, doubles the effective sensitivity while dividing the capacitance by two, according to various embodiments.

Figure 4B:
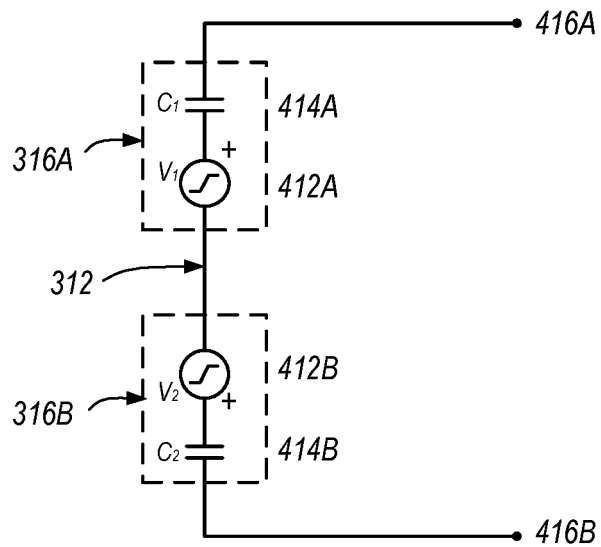

In various embodiments, the equivalent circuit of a piezoelectric element 316 may be modeled as a voltage source in series with a capacitor (for frequencies below electrical or mechanical resonances). Turning to FIG. 4B, circuit diagram 410 depicts an equivalent circuit of the bender element 402 of FIG. 4A, according to some embodiments. As shown in diagram 410, each of piezoelectric elements 316 are represented by a voltage source in series with a capacitor. For example, piezoelectric element 316A is represented as voltage source 412A in series with capacitor 414A and piezoelectric element 316B is represented as voltage source 412B in series with capacitor 414B. As shown in FIG. 4B, substrate element 312 is located between the piezoelectric elements 316 in the equivalent circuit. Further note that, as shown in circuit diagram 410, the polarity of the voltage sources 412 for the piezoelectric elements 316 in the series configuration are opposite. That is, in the series configuration of bender element 402, the negative electrode of the voltage source 412A and the negative electrode of voltage source 412B are both connected to the substrate element 312.

In various embodiments, when the bender element 402 flexes (e.g., due to the particle motion of an incident pressure wave received by two-axis sensing element 202) the stresses induced in the two piezoelectric elements 316 are substantially equal and opposite. Consider, for example, an instance in which bender element 402 flexes such that the upper piezoelectric element 316A experiences tension and the lower piezoelectric element 316B experiences a compression. In such an instance, the mechanical stress in the piezoelectric elements 316 causes a resulting current to flow out of the positive electrode of the upper piezoelectric elements 316A and a resulting current to flow into the positive electrode of lower piezoelectric element 316B. That is, in the series connection configuration of bender element 302E, the described flexing causes a current to flow out of terminal 416A and into terminal 416B.

Note that, in the equivalent circuit depicted in diagram 410, the open circuit voltage generated between terminals 416A and 416B is equal to $V_1+V_2$. Similarly, the capacitance seen looking across the terminals 416A and 416B is equal to $(C_1*C_2)/(C_1+C_2)$.

Figure 4C:
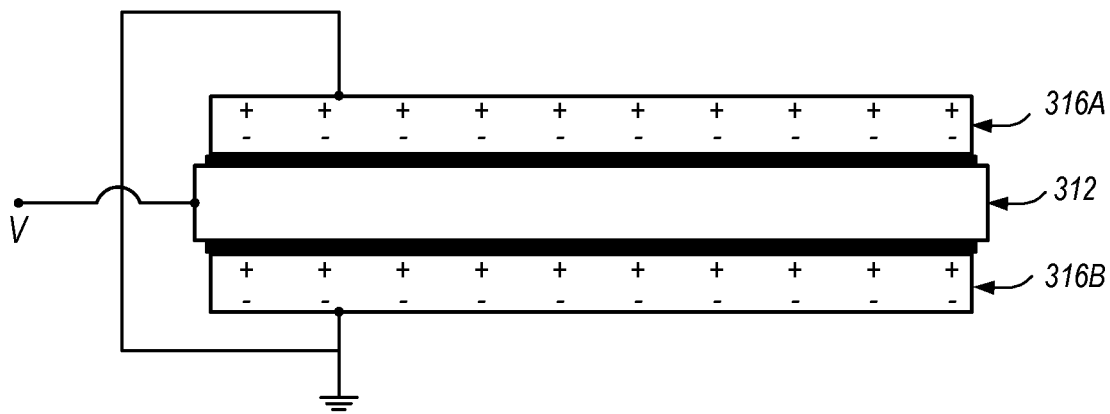
FIGS. 4C-4D are diagrams illustrating an example bender element in which the piezoelectric elements are connected in parallel, according to some embodiments.

In FIG. 4C, diagram 420 depicts an embodiment of a bender element, bender element 404, in which the piezoelectric elements 316A and 316B are connected in parallel. In the embodiment depicted in FIG. 4C, the negative electrode of piezoelectric element 316A is connected to the substrate element 312 while, for piezoelectric element 316B, it is the positive electrode that is connected to substrate element 312. Note that, in bender element 404, external electrical connection is made to the node formed between the undersides of each of the piezoelectric elements 316. In some embodiments, this may be achieved by incorporating a metal substrate plate to which the piezoelectric elements 316 may be directly connected. Additionally, note that, as shown in FIG. 4C, the outer electrodes of bender element 404 are connected together in this parallel configuration, according to some embodiments. In the embodiment of FIG. 4C, when the bender element 404 flexes, current flows out of the positive electrode of the piezoelectric element 316 that is in planar tension and into the positive electrode of the piezoelectric element 316 the experiences planar compression.

Figure 4D:
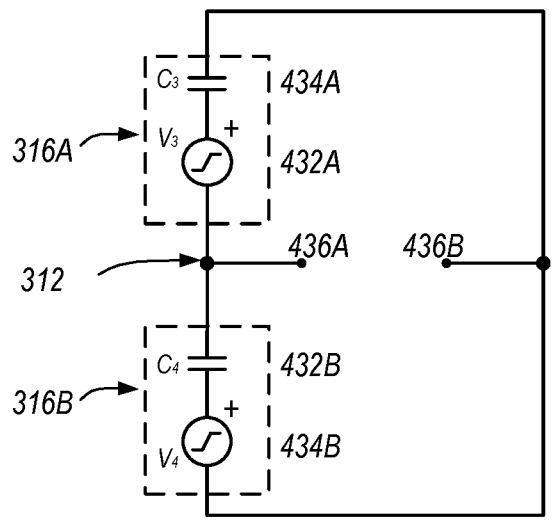

In FIG. 4D, circuit diagram 430 depicts an equivalent circuit of bender element 404 of FIG. 4C, according to some embodiments. As shown in circuit diagram 430, each of piezoelectric elements 316 is represented by a voltage source in series with a capacitor. For example, piezoelectric element 316A is represented by voltage source 432A in series with capacitor 434A and piezoelectric element 316B is represented by voltage source 432B in series with capacitor 434B, with substrate element 312 located between the two piezoelectric elements 316. As with bender element 402 of FIG. 4A, bender element 404 is configured such that, when the bender element 404 flexes, the mechanical stresses induced in the two piezoelectric elements 316 are equal and opposite. Consider, for example, an instance in which the bender elements 404 flex such that the upper piezoelectric element 316A experiences a tension and the lower piezoelectric element 316B experiences a compression. In such an instance, the mechanical stress in the piezoelectric elements 316 causes a resulting current to flow out of the positive electrode of voltage source 432A and a resulting current to flow into the positive electrode of voltage source 432B. As such, current flows into terminal 436A and out of terminal 436B, in this example.

Note that, in the equivalent circuit depicted in diagram 430, the open circuit voltage generated between terminals 436A and 436B is equal to:

$$\frac{(V_3 * C_3) + (V_4 * C_4)}{(C_3 + C_4)}$$

If the voltage $V_3=V_4$ and $C_3=C_4$, the voltage between terminals 436A and 436B simply equals $V_3=V_4$. Further, in the depicted embodiment, the capacitance seen looking across the terminals 436A and 436B is equal to $(C_3+C_4)$. In various embodiments, the parallel configuration of bender element 404 shown in FIG. 4C results in one-half the voltage sensitivity and four times the capacitance of the series configuration of bender element 402 shown in FIG. 4A. Note that, in various embodiments, the energy sensitivity of bender element 404 is equal to the energy sensitivity of bender element 402.

As described above with reference to FIGS. 4A-4C, the piezoelectric elements 316 in a given bender element may be connected either in series or in parallel, according to various embodiments. Further, as noted above, two-axis sensing element 202 includes pairs of bender elements 302 in which the bender elements 302 in a pair are connected to one another. For example, with reference to FIG. 3A, bender element 302A and 302B may be considered a first pair of bender elements and bender elements 302C and 302D may be considered a second pair of bender elements. In various embodiments, the individual bender elements 302 in the pairs may be connected to one another either in series or in parallel. For example, for the first pair of bender elements, bender elements 302A and 302B may be connected to one another either in series or in parallel, and, for the second pair of bender elements, bender elements 302C and 302D may be connected to one another either in series or in parallel. With reference to FIGS. 4E-4H, four alternate configurations for connecting a pair of bender elements, including both the connection of the piezoelectric elements 316 within a bender element and the connection of the bender elements to one another, are described.

Figure 4E:
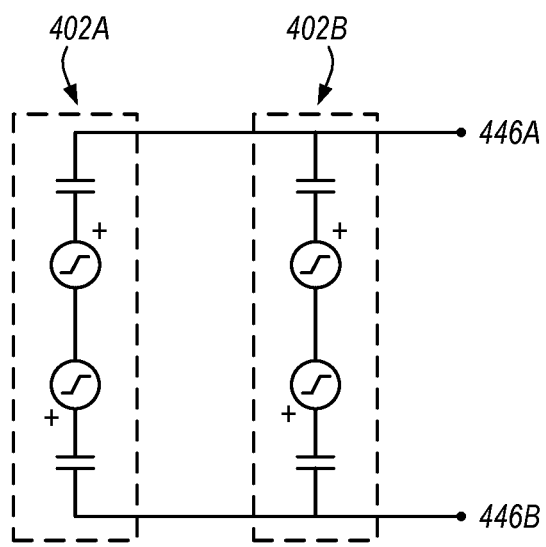
FIGS. 4E-4H are diagrams illustrating various configurations for connecting a pair of bender elements to one another, according to some embodiments.
Figure 4F:
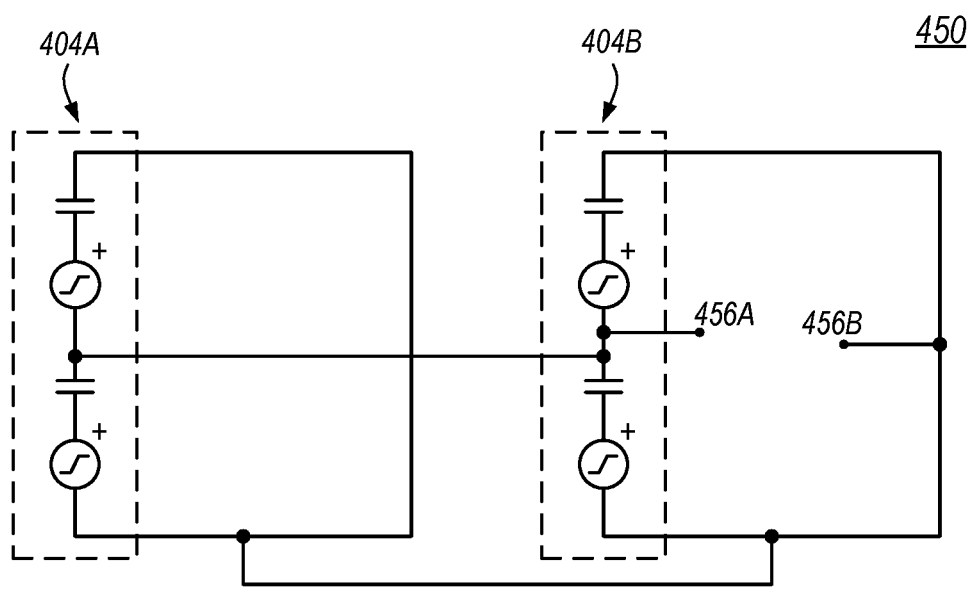
Figure 4G:
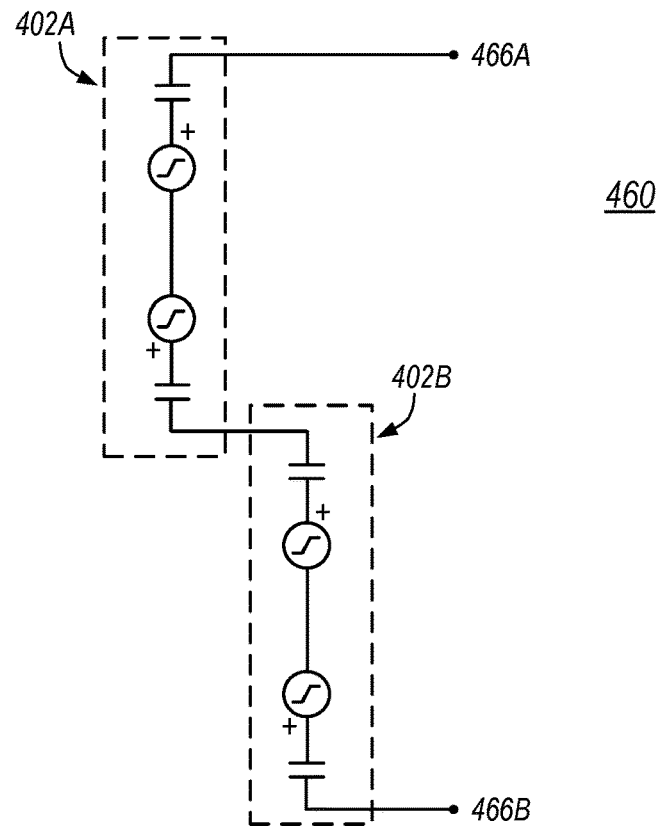
Figure 4H:
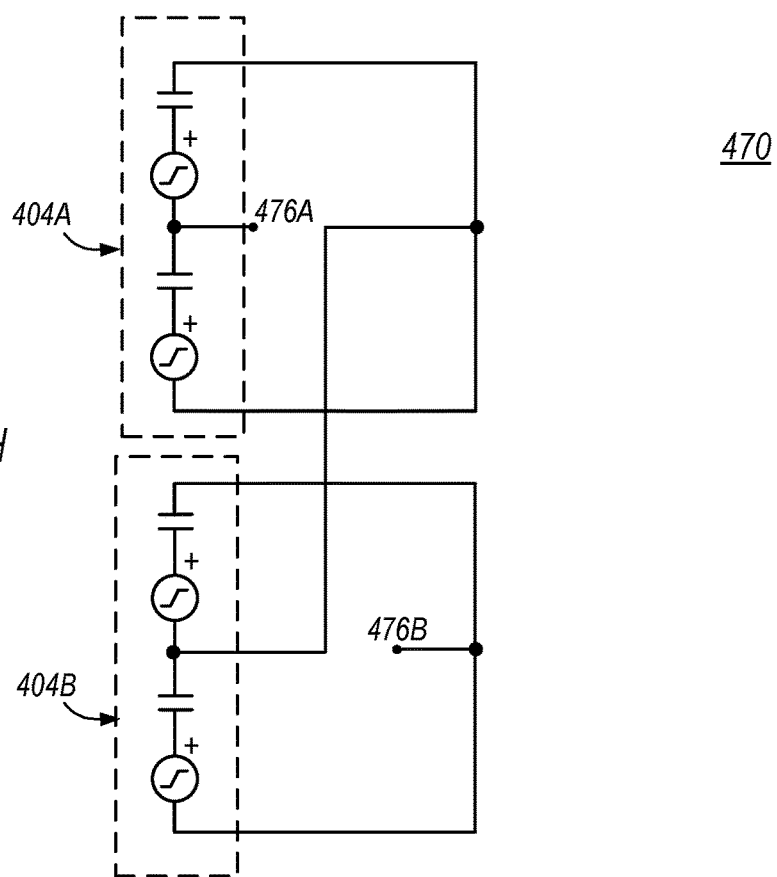

In FIG. 4E, for example, circuit diagram 440 depicts an equivalent circuit for a pair of series-type bender elements 402A and 402B connected to one another in parallel, according to some embodiments. In FIG. 4F, circuit diagram 450 depicts an equivalent circuit for a pair of parallel-type bender elements 404A and 404B that are connected to one another in parallel, according to some embodiments. In FIG. 4G, circuit diagram 460 depicts an equivalent circuit for a pair of series-type bender elements 402A and 402B that are connected to one another in series, according to some embodiments. In FIG. 4H, circuit diagram 470 depicts an equivalent circuit for a pair of parallel-type bender elements 404A and 404B that are connected to one another in parallel, according to some embodiments. In various embodiments, each of the bender elements 402 depicted in FIGS. 4E and 4G may correspond to the series-type configuration of bender element 402 depicted in FIG. 4A. Further, in various embodiments, each of the bender elements 404 depicted in FIGS. 4F and 4H may correspond to the parallel-type configuration of bender element 404 depicted in FIG. 4C.

In various embodiments, any of the configurations depicted in FIGS. 4E-4H for a pair of bender elements may be used in two-axis sensing element 202. Note, however, that in various embodiments, it may be desirable to connect the two pairs of bender elements in a two-axis sensing element 202 in the same manner. For example, in an embodiment in which the first pair of bender elements includes two series-type bender elements connected to each other in parallel (e.g., as shown in circuit diagram 440 of FIG. 4E) it may also be desirable to connect the second pair of bender elements in the two-axis sensing element 202 as series-type bender elements connected to one another in parallel.

Note that, in various embodiments, such connective decisions, such as whether to utilize series-type or parallel-type bender elements and whether to connect the bender elements to one another in series or in parallel, may be made based on the band of frequencies that are being sensed. For example, in various embodiments, utilization of parallel-type bender elements connected in parallel (as shown in FIG. 4F) may offer improved low-frequency noise performance. Further, in various embodiments, at higher frequencies, utilization of series-type bender elements connected in series (as shown in FIG. 4G) may offer improved performance as it yields a higher sensitivity, relative to other possible connective configurations.

Figure 5A:
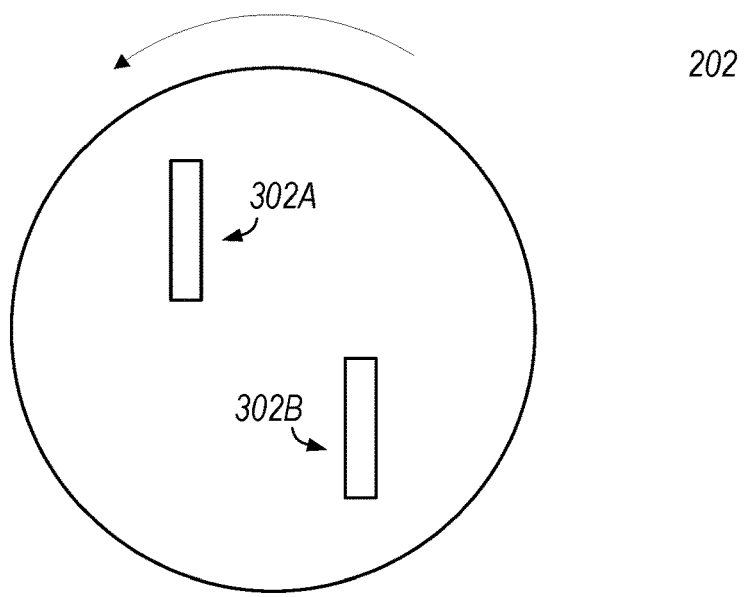
FIGS. 5A-5B are block diagrams illustrating an example two-axis sensing element as it experiences a rotational acceleration, according to some embodiments.
Figure 5B:
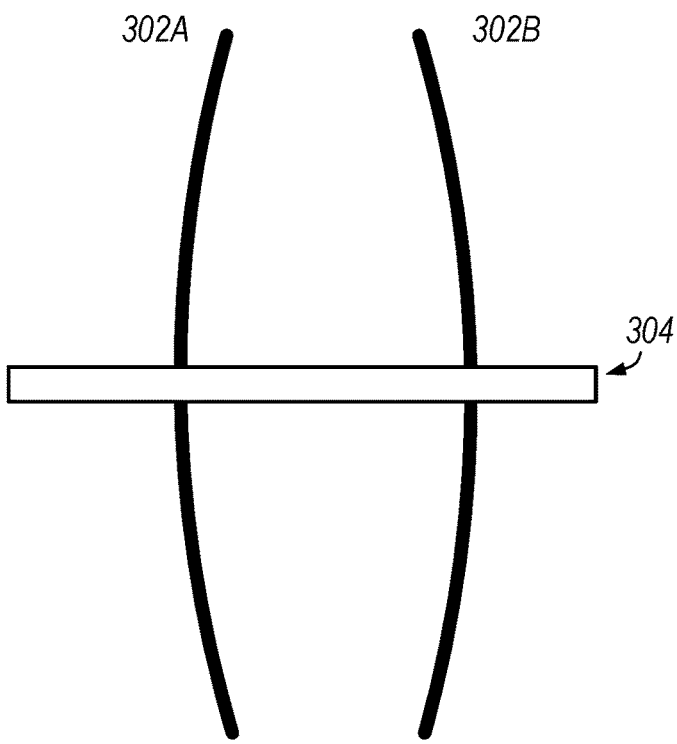

Referring now to FIGS. 5A-5B, block diagrams 500 and 510 depict an example two-axis sensing element 202 as it experiences a rotational acceleration about its longitudinal axis, according to some embodiments. (Note that, in FIGS. 5A and 5B, only a single pair of bender elements 302 in the two-axis sensing element 202 are shown, for clarity.) More specifically, FIG. 5A depicts a front elevation view of two-axis sensing element 202 as it experiences a rotational acceleration about its longitudinal axis in a counterclockwise direction. For example, two-axis sensing element 202 may be deployed within a streamer 20 and used to record particle motion data detected during a seismic survey. In the course of performing a survey, streamer 20 is towed through the (potentially turbulent) water column, creating friction between the external surface of the streamer 20 and the water. This friction, in turn, could potentially introduce motion-based noise into the particle motion data detected by a particle motion sensing element deployed within the streamer. For example, in some instances, the streamer 20 may instantaneously rotate about its center or longitudinal axis, thereby creating noise in the particle motion data gathered by the particle motion sensing element. In various embodiments, however, two-axis sensing element 202 is configured to mitigate such noise due to rotational motion of the streamer 20, resulting in particle motion data with preferential signal-to-noise conditions, as described in more detail in paragraph 66.

Referring to FIG. 5B, diagram 510 depicts a view of the two-axis sensing element 202 from above as it experiences the instantaneous rotational acceleration, according to some embodiments. As described above, the mounting plate 304 of two-axis sensing element 202 transects the bender elements 302 into two cantilever portions 308, which may flex when exposed to an acceleration. This flexing may then cause a mechanical stress to be induced in the piezoelectric elements 316 on the bender elements 302, causing the bender elements to generate a corresponding signal. For example, when a pressure wave is received at the two-axis sensing element 202, it may cause bender elements 302 to flex and generate a signal that corresponds to the particle motion associated with the pressure wave. In various embodiments, however, the flexing of bender elements 302 may also enable the two-axis sensing element 202 to mitigate rotational noise that may otherwise be introduced in the particle motion data.

For example, as shown in FIG. 5B, when the two-axis sensing element 202 rotates in the counter-clockwise direction, it causes the bender elements 302A and 302B to flex. Rather than flex in the same direction, as would be the case in the event that two-axis sensing element 202 experienced a linear acceleration, the instantaneous rotational acceleration of FIG. 5B causes the bender elements 302A and 302B to flex in opposite directions. In various embodiments, this flexure in opposite directions causes the bender elements 302A and 302B to generate signals of opposite polarity. For example, consider an embodiment in which the bender elements 302A and 302B are series-type bender elements 402A and 402B connected to one another in parallel, as described above with reference to FIG. 4E. In such an embodiment, when bender element 302A flexes "down" (e.g., to the right with respect to the plan view shown in FIG. 5B), current may flow out of terminal 446A. Conversely, when bender element 302B flexes "up" (e.g., to the left with respect to the plan view shown in FIG. 5B), current may flow into terminal 446A. (Although described with reference to the configuration of bender elements shown in FIG. 4E, bender elements 302 of FIG. 5B may be arranged in any of the configurations shown in FIGS. 4E-4H, according to various embodiments.)

Note that, in various embodiments, bender elements 302A and 302B are oriented in the same direction relative to the acceleration being sensed. In such embodiments, this arrangement may cause opposite stresses to be induced in each of bender element 302A and 302B when the sensing element 202 is subjected to rotation around its longitudinal axis. Accordingly, in various embodiments, the extent to which the bender elements 302A and 302B flex in response to a given rotational acceleration will be the same or substantially the same. As such, the magnitude of the signals generated by bender elements 302A and 302B will also be the same or substantially the same. Accordingly, in various embodiments, bender elements 302A and 302B will generate signals of the same (or substantially the same) magnitude and opposite polarities in response to a rotational acceleration. In various embodiments, the charge displacement of signals from different bender elements will at least partially cancel (and, in some instances, entirely cancel), mitigating or eliminating signal noise that would otherwise be introduced by the rotational acceleration of the two-axis sensing element 202.

Further note that, although cancelation of rotational noise is demonstrated with reference to bender elements 302A and 302B in FIGS. 5A-5B, bender elements 302C and 302D may similarly be configured to mitigate rotational noise introduced by the rotational acceleration of the two-axis sensing element 202. For instance, in the example demonstrated with reference to FIGS. 5A-5B, the rotational acceleration may cause opposite stresses to be induced in each of bender element 302C and 302D, which, in turn, may cause the bender elements 302C and 302D to create signals of the same (or substantially the same) magnitude and opposite polarity, thereby mitigating signal noise that would otherwise be caused by the rotation of the sensing element 202.

Additionally, note that the disclosed two-axis sensing element 202 may also facilitate canceling of noise due to rotation in directions other than rotation about the longitudinal axis. As one non-limiting example, the disclosed two-axis sensing element 202 may also facilitate the cancelation of noise that would otherwise be induced by rotation of the sensing element 202 about its central axis (e.g., pitch or yaw rotation), as such rotation may cause opposite stresses to be induced in each bender element in a respective pair. As with rotational acceleration about the longitudinal axis, the opposite stresses caused by rotation about the sensing element 202's central axis may cause a given pair of bender elements to create signals of the same (or substantially the same) magnitude and opposite polarity, mitigating signal noise.

Figure 6A:
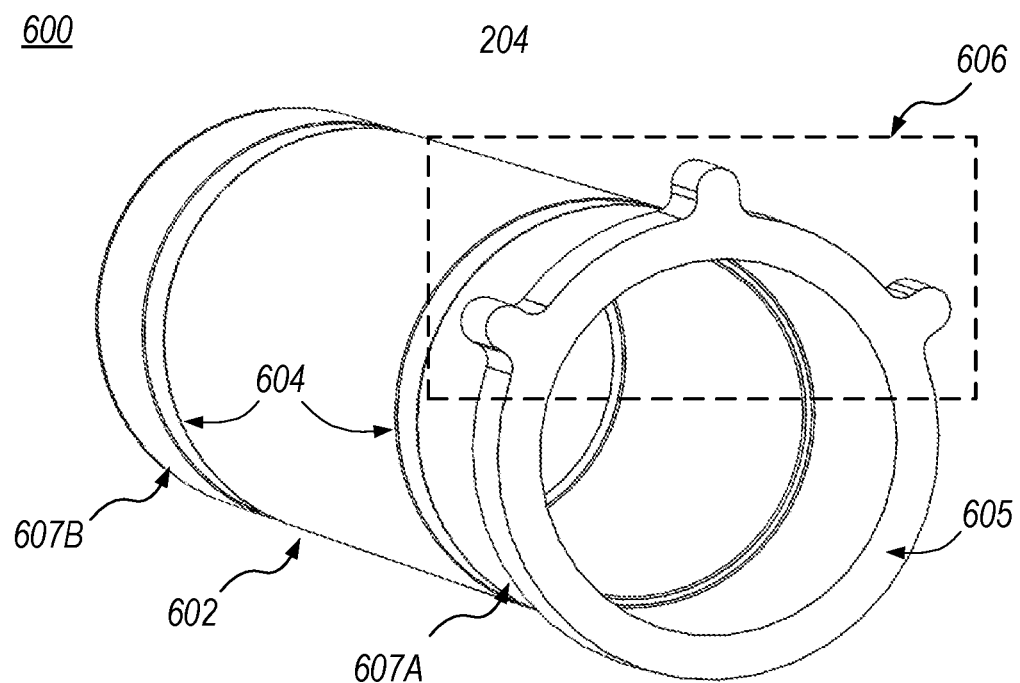
FIGS. 6A-6B are diagrams illustrating an example sensor housing, according to some embodiments.

Turning now to FIG. 6A, block diagram 600 depicts a perspective view of sensor housing 204, according to some embodiments. In various embodiments, sensor housing 204 is configured to be deployed within the cavity 902 through the body of the spacer carrier 206, as described in more detail below with reference to FIGS. 9A-9B. As shown in FIG. 6A, sensor housing 204 includes a hollow housing body 602 that is configured to receive a sensor, such as two-axis sensing element 202. For example, in some embodiments, the internal profile of the sensor housing 204 includes two progressive diametric steps (e.g., counter-bores) that provide annular mounting points such that the two-axis sensing element 202 and the capping element 210 may be mounted within the sensor housing 204, as will be discussed in more detail below with reference to FIGS. 7A-7B.

In some embodiments, the exterior surface of the housing body 602 is tapered to allow for easier insertion into the cavity 902 in spacer carrier 206. For example, in some embodiments, the exterior surface of the housing body 602 is tapered from a first diameter 607A towards the mouth 605 of the sensor housing 204 to a second, smaller diameter 607B at the terminal end of the sensor housing 204. Further note that, in various embodiments, the external surface of the housing body 602 includes one or more grooves 604 that are configured to receive corresponding O rings 214. In various embodiments, O rings 214 may be constructed from rubber or any of various other suitable materials. As noted above, O rings 214 may be seated within the grooves 604 on the external surface of the housing body 602. When the sensor housing 204 is then inserted into the spacer carrier 206, the sensor housing 204 is supported by the O rings 214 within the cavity 902 in the spacer carrier 206 such that there is a physical gap between the housing body 602 and the inner wall of the spacer carrier 206. This physical gap may provide various improvements to the robustness of the sensor assembly 208. For example, in various embodiments, utilizing this technique to create a physical gap between the external surface of the housing body 602 and the inner wall of the spacer carrier 206 may assist in displacing mechanical stress that is applied to the sensor assembly 208, ensuring the two-axis sensing element 202 disposed therein is not damaged during deployment.

Figure 6B:
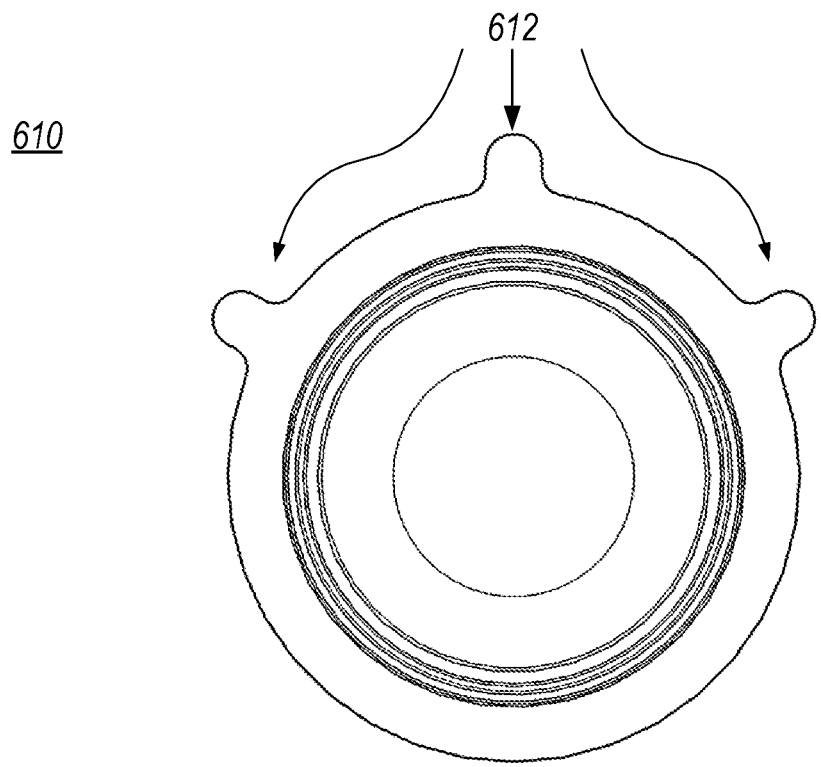

Referring now to FIG. 6B, block diagram 610 depicts a front elevation view of sensor housing 204, according to some embodiments. More specifically, FIG. 6B provides a view into the mouth 605 of the sensor housing 204. As shown in block diagram 610, sensor housing 204 includes alignment element 606. In various embodiments, alignment element 606 is configured to interface with a corresponding alignment element 904 on the spacer carrier 206 to maintain an orientation of the sensor housing 204 within the cavity 902 of the spacer carrier 206 when the sensor housing 204 is inserted into the cavity 902. Various embodiments of the corresponding alignment element 904 located on the spacer carrier 206 will be discussed in more detail below with reference to FIGS. 9A-9B. In the depicted embodiment, alignment element 606 includes three raised nodes 612 located along a periphery of the mouth 605 of the sensor housing 204. For example, in the depicted embodiment, there is a 60-degree angle between successive raised nodes 612 along the periphery of the mouth 605 of the sensor housing 204. Note, however, that this embodiment is provided merely as an example. In other embodiments, alignment element 606 may include additional or fewer raised nodes 612 located at other (potentially non-uniform) intervals along the periphery of the mouth 605 of the sensor housing 204, as desired. For example, in some embodiments, alignment element 606 may include a single raised node 612 along the periphery of the mouth 605 of sensor housing 204. In other embodiments, however, alignment element 606 may include six or more raised nodes 612. Note, however, that in embodiments in which alignment element 606 includes one or more raised nodes 612 located on the sensor housing 204, the corresponding alignment element 904 located on the spacer carrier 206 will typically include a corresponding number of depressions within the body of the spacer carrier 206 that are configured to receive these one or more raised nodes 612. Further note that, although the raised nodes 612 of alignment element 606 are semicircular in shape in the depicted embodiment, this is provided merely as an example and is not intended to limit the scope of the present disclosure. In other embodiments in which the alignment element 606 includes one or more raised nodes 612, such nodes 612 may be of any suitable shape.

Figure 7A:
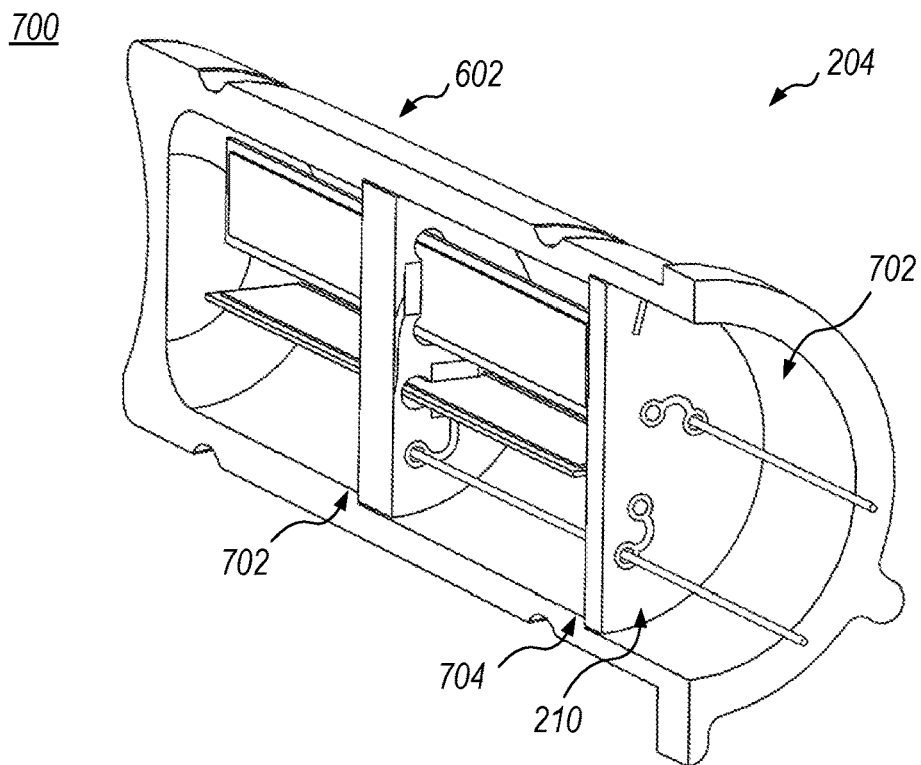
FIGS. 7A-7B are diagrams illustrating an example sensor housing in which a sensor has been mounted, according to some embodiments.
Figure 7B:
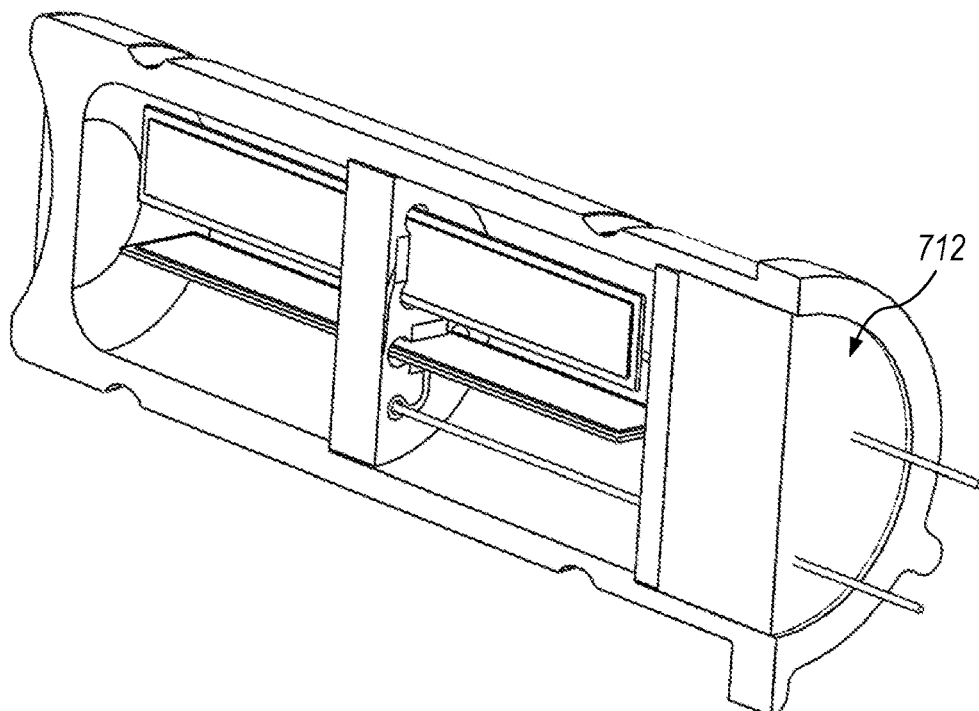

Turning now to FIG. 7A, block diagram 700 depicts a perspective, cross-sectional view of a sensor housing 204 in which a two-axis sensing element 202 and the capping element 210 are mounted, according to some embodiments. As shown in FIG. 7A, sensor housing 204 includes a housing body 602 that is configured to receive a sensor (such as the two-axis sensing element 202, in the depicted embodiment). More specifically, the internal profile of housing body 602 includes a series of progressive diametric steps to facilitate the mounting of the two-axis sensing element 202 and the capping element 210. For example, as shown in FIG. 7A, housing body 602 includes a first counter-bore located towards a terminal end of the sensor housing 204 (e.g., the end opposite of the mouth 605 of sensor housing 204) that creates a first annular step 702 along an inner wall of the housing body 602 that is dimensioned to receive a mounting plate 304 of the two-axis sensing element 202. In various embodiments, annular step 702 may be used to mount any of various suitable types of sensors. In the present disclosure, various embodiments are discussed in which two-axis sensing element 202 is mounted on the first annular step 702 within the sensor housing 204. Note, however, that such examples are not intended to limit the scope of the present disclosure and, in other embodiments, sensor housing 204 may be used to house any other suitable sensing device, as desired.

In various embodiments, two-axis sensing element 202 may be mounted to the annular step 702 through use of an adhesive. For example, during the process of mounting the two-axis sensing element 202 within the sensor housing 204, an adhesive may first be applied to this internal annular step 702. The two-axis sensing element 202 may then be oriented to a desired position using an alignment tool that utilizes the alignment element 606 to achieve the desired orientation of the sensing element 202 and hold the sensing element 202 in place during the curing of the adhesive. In this way, various disclosed embodiments may utilize the alignment element 606 on the sensor housing 204 both to establish a desired orientation of the sensor (e.g., the two-axis sensing element 202) within the sensor housing 204 and to maintain an orientation of the sensor housing 204 within the cavity 902 of the spacer carrier 206 when the sensor housing 204 is inserted into the cavity 902. Note that, in various embodiments, the sensor may be mounted within the sensor housing 204 using various other suitable techniques. As one non-limiting example, in some embodiments, mounting plate 304 of the two-axis sensing element 202 may include one or more through-holes positioned to align with corresponding holes on the first annular step 702. In such embodiments, the sensor may be mounted within the sensor housing 204 through use of one or more fastening elements (e.g., screws, bolts, pens, or any other suitable fastening element).

Further, in the depicted embodiment, housing body 602 includes a second counter-bore located towards the mouth 605 of the sensor housing 204 that creates a second annular step 704 along the inner wall of the housing body 602. In various embodiments, the second annular step 704 is dimensioned to receive a capping element 210. In various embodiments, capping element 210 effectively "caps" the sensor housing 204 and provides electrical feed-through of the two-axis sensing element 202's electrical connection wires to components outside sensor assembly 208. In the depicted embodiment, capping element 210 includes a connective plate having four holes (only two of which are visible in the cross-sectional view of FIG. 7A) into which wires may be fed to connect the two-axis sensing element 202 to other components located within the streamer 20. For example, in some embodiments, the wires may include two twisted pair conductors that may be soldered to the connective plate. Corresponding wires may then be soldered to the other side of the connective plate (e.g., the surface visible in diagram 700 of FIG. 7A) to facilitate the electrical connection of the housed two-axis sensing element 202 to outside components. Note, however, that this embodiment is provided merely as an example and is not intended to limit the scope of the present disclosure. In other embodiments, other suitable capping elements 210 may be used. For example, as described below with reference to FIGS. 8A-8B, in some embodiments an alternate capping element 210 may be used that includes one or more passageways through which the wires are routed from the two-axis sensing element 202, through the mouth 605 of the sensor housing 204, to external components. As with the two-axis sensing element 202, the capping element 210 may be mounted to the second annular step 704 using various suitable techniques. For example, in some embodiments, the capping element 210 is mounted to the second annular step 704 using an adhesive. In other embodiments, the capping element 210 may be mounted to the annular step 704 using suitable fastening elements, as discussed above.

Annular steps 702 and 704 may be various suitable sizes to facilitate the mounting of the two-axis sensing element 202 and the capping element 210, according to various embodiments. For example, in one non-limiting embodiment, the first counter-bore that forms the first annular step 702 may have diameters of 13.70 millimeters (closer towards the terminal end of the sensor housing 204) and 14.70 millimeters (closer to the mouth 605 of the sensor housing 204) such that the first annular step 702 provides a 0.5 millimeter mounting surface along which the two-axis sensing element 202 may be mounted. Further, in one non-limiting embodiment, the second counter-bore that forms the second annular step 704 may have diameters of 15.08 millimeters (closer towards the terminal end of the sensor housing 204) and 15.98 (closer to the mouth 605 of the sensor housing 204) such that the second annular step 704 provides a 0.45 millimeter mounting surface along which the capping element 210 may be mounted. Note, however, that these embodiments are provided merely as non-limiting examples and that the diameters of the counter-bores and the corresponding sizes of the annular steps 702 and 704 may vary. For example, in some embodiments, the annular steps 702 and 704 may be between 0.3 and 1.0 millimeters, inclusive. Further note that, in various embodiments, annular steps 702 and 704 may be of the same or of different sizes, as desired.

As shown in FIG. 7A, the second annular step 704 is positioned at a distance from the mouth 605 of the sensor housing 204 such that there is a void between a first surface of the capping element 210 (e.g., the top surface of capping element 210 visible in FIG. 7A) and the mouth 605 of the sensor housing 204. In various embodiments, this void may create an effective potting cup 706, into which a potting compound 712 may be introduced to create a watertight seal of the two-axis sensing element 202 within the sensor housing 204. For example, block diagram 710 of FIG. 7B shows an embodiment in which the two-axis sensing element 202 has been mounted on the first annular step 702, the capping element 210 has been mounted on the second annular step 704, and a potting compound 712 has been introduced into the potting cup 706 to create a watertight seal for the two-axis sensing element 202 within the sensor housing 204. In various embodiments, any suitable potting compound 712 may be used. For example, in some embodiments, potting compound 712 includes a polyurethane resin sealant. Further, note that sensor housing 204 may be constructed from various suitable materials. For example, in some embodiments, sensor housing 204 is constructed from an injection molded plastic.

Figure 8A:
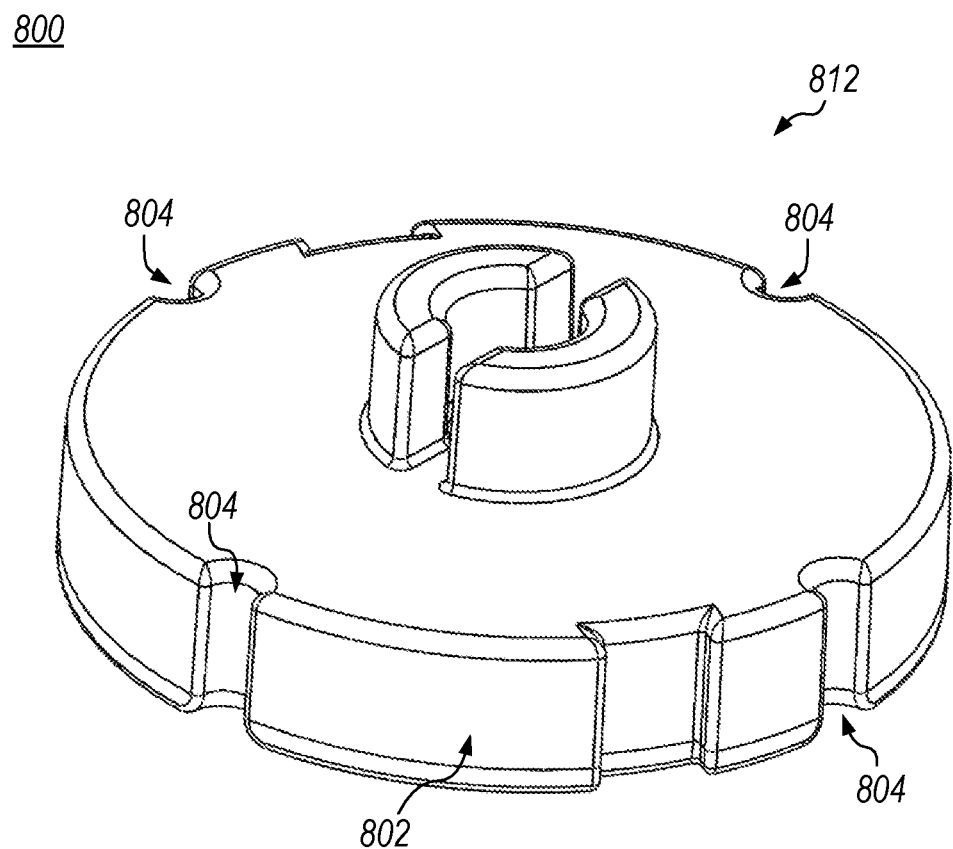
FIGS. 8A-8B are diagrams illustrating an example end cap, according to some embodiments.
Figure 8B:
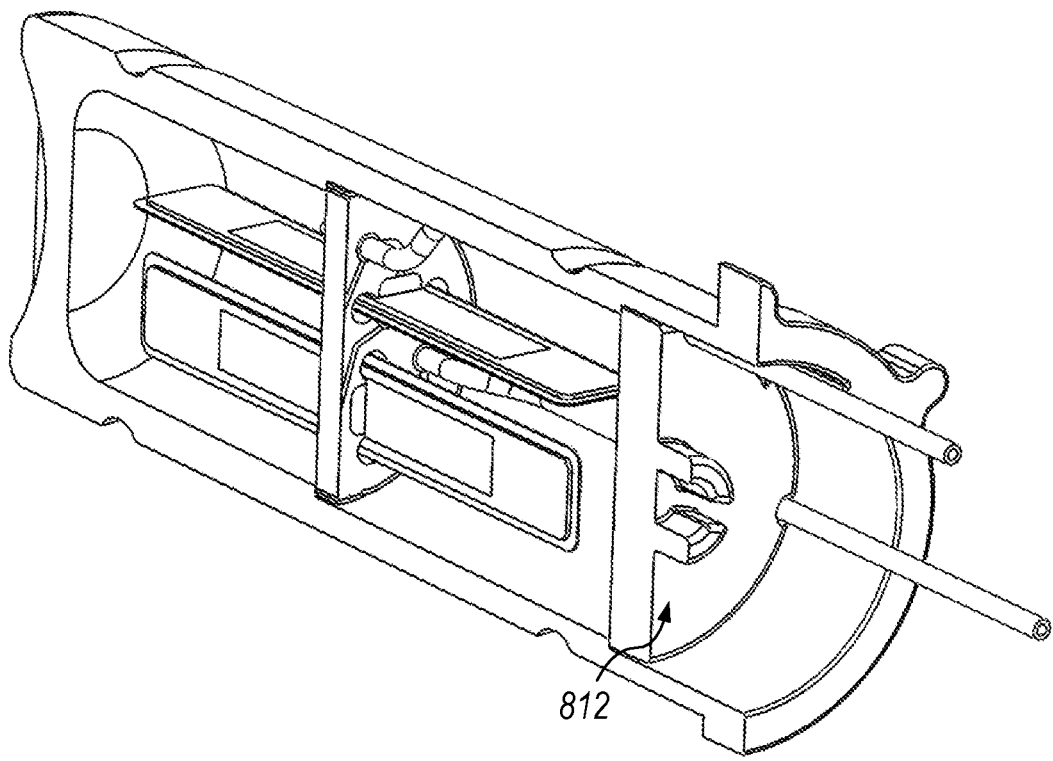

With reference to FIGS. 8A-8B, an example end cap 812 is described that may be used as a capping element 210 to "cap" the sensor housing 204 while allowing for electrical connection between the two-axis sensing element 202 and components external to the sensor housing 204, according to various embodiments. Referring to FIG. 8A, diagram 800 depicts a perspective view of end cap 812, according to some embodiments. End cap 812 may be constructed as an injection molded component, according to some embodiments. As shown in FIG. 8A, end cap 812 incorporates four small passageways 804 that provide passage for the connecting wires to the two-axis sensing element 202. In the depicted embodiment, these passageways 804 are semicircular and located at 90° intervals along the periphery of the end cap 812, though the passageways 804 may be located at other intervals and in different shapes, as desired. Rather than using an electrical feed-through structure (e.g., as used by the conducting plate shown in FIGS. 7A-7B), various embodiments of end cap 812 allow for the connecting wires to be routed through the passageways 804 and soldered directly to the mounting plate 304 on the two-axis sensing element 202.

Turning to FIG. 8B, block diagram 810 depicts a perspective, cross-sectional view of a sensor housing 204 in which an end cap 812 is used as the capping element 210, according to some embodiments. During the assembly process, the four wires (e.g., 26 AWG or any other suitable conductor) to the two-axis sensing element 202 may be held in the appropriate diametrical location such that each wire falls into the appropriate passageway 804 as the end cap 812 is positioned into the sensor assembly. Note that, in some embodiments, use of the end cap 812, rather than the connective plate shown in FIGS. 7A-7B, as the capping element 210 may make it faster or less expensive to produce sensor assembly 814, thereby offering cost savings.

Note that, in some embodiments, end cap 812 may be mounted within the sensor housing 204 using an interference fit in which the end cap 812 is fastened into position on the second annular step 704 through friction between the inner wall of the housing body 602 and an exterior wall 802 of the periphery of the end cap 812. In some embodiments, end cap 812 may be mounted within the sensor housing 204 using an interference fit either instead of or in addition to the use of an adhesive or other suitable fastening techniques.

Figure 9A:
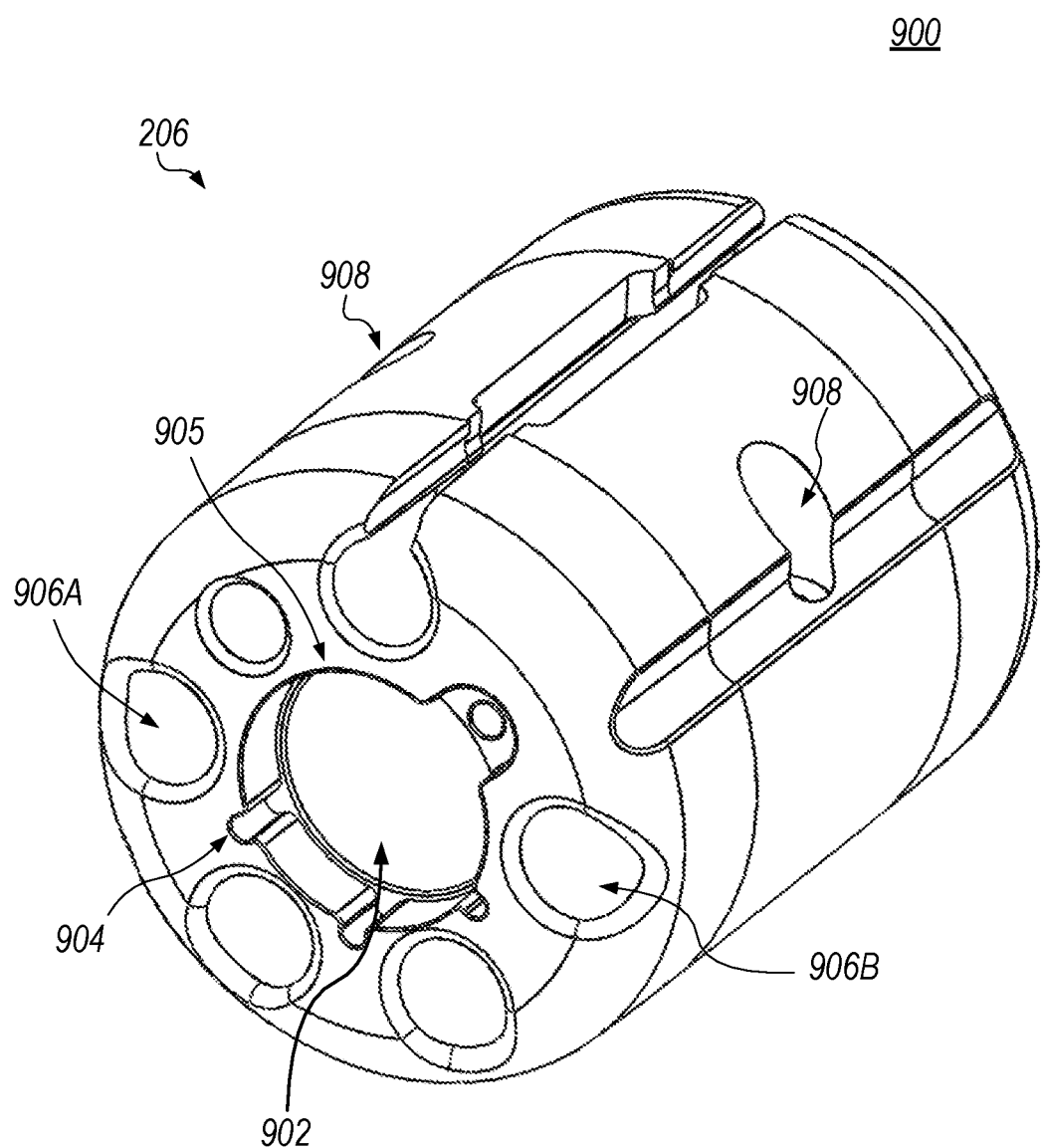
FIGS. 9A-9B are diagrams illustrating an example spacer carrier, according to some embodiments.

Turning now to FIG. 9A, block diagram 900 depicts a perspective view of a spacer carrier 206, according to some embodiments. As described above, in various embodiments, spacer carrier 206 is configured to receive sensor housing 204 to create a sensor assembly 208, which may be deployed within a seismic streamer 20. In various embodiments, spacer carrier 206 is configured to provide protective, aligned containments of the two-axis sensing element 202 within a seismic streamer 20. As shown in FIG. 9A, spacer carrier 206 includes various cavities and channels to facilitate receiving the sensor housing 204 and deployment within the streamer 20. In some embodiments, spacer carrier 206 is an injection molded body that may be constructed, for example, from rigid polyurethane thermoplastic or glass-filled polypropylene, though other suitable materials may be used.

As shown in FIG. 9A, spacer carrier 206 includes a cavity 902 that is configured to receive the sensor housing 204. In various embodiments, the cavity 902 is a tapered through-hole located at a center of a longitudinal axis through the body of the spacer carrier 206. In such embodiments, the external surface of the sensor housing 204 may be similarly tapered such that the internal taper of the cavity 902 matches the exterior taper of the housing body 602. Note that, in the depicted embodiment, cavity 902 is a through-hole that extends entirely through the body of spacer carrier 206. In other embodiments, however, cavity 902 may not extend entirely through the body of spacer carrier 206 such that, like sensor housing 204, cavity 902 has only one open end.

In various embodiments, spacer carrier 206 includes an alignment element 904 that is configured to interface with the alignment element 606 on the sensor housing 204. In such embodiments, when the sensor housing 204 is inserted into the cavity 902, alignment elements 606 and 904 maintain the orientation of the sensor housing 204 within the cavity 902 of the spacer carrier 206. In the depicted embodiment, alignment element 904 includes three depressions within the body of the spacer carrier 206 at the mouth 905 of the cavity 902, which are configured to receive the three raised nodes 612 of alignment element 606 located along the periphery of the mouth 605 of the sensor housing 204. In various embodiments, the alignment element 904 and its structural equivalents may be referred to as a "first means for aligning an orientation of a sensor housing within the cavity when the sensor housing is inserted into the cavity." Further, in various embodiments, the alignment element 606 and its structural equivalents may be referred to as a "second means for interfacing with the first means to align the orientation of the spacer carrier housing within the cavity."

Further, as shown in FIG. 9A, spacer carrier 206 includes through-holes 906A-B configured to receive ropes included as part of the structure of the streamer 20. For example, in various embodiments, during the manufacture of streamer 20, one or more sensor assemblies 208 may be threaded, using through-holes 906 in the spacer carrier 206, onto two parallel ropes that function as strain members for the streamer 20. Once the sensor assembly 208 is positioned in the desired location, it may be attached to the two ropes. In some embodiments, the sensor assembly 208 is attached to the ropes through use of an adhesive. For example, as shown in FIG. 9A, spacer carrier 206 includes two vertically oriented adhesive pathways 908 that allow the adhesive to soak into the ropes, securing the sensor assembly 208 at the desired location. In some embodiments, through holes 906 are also roughened or helically tapped such that the adhesive flows through the fibers of the rope and the sensor assembly 208 becomes attached to the ropes at the desired location through both adhesion and mechanical keying.

Figure 9B:
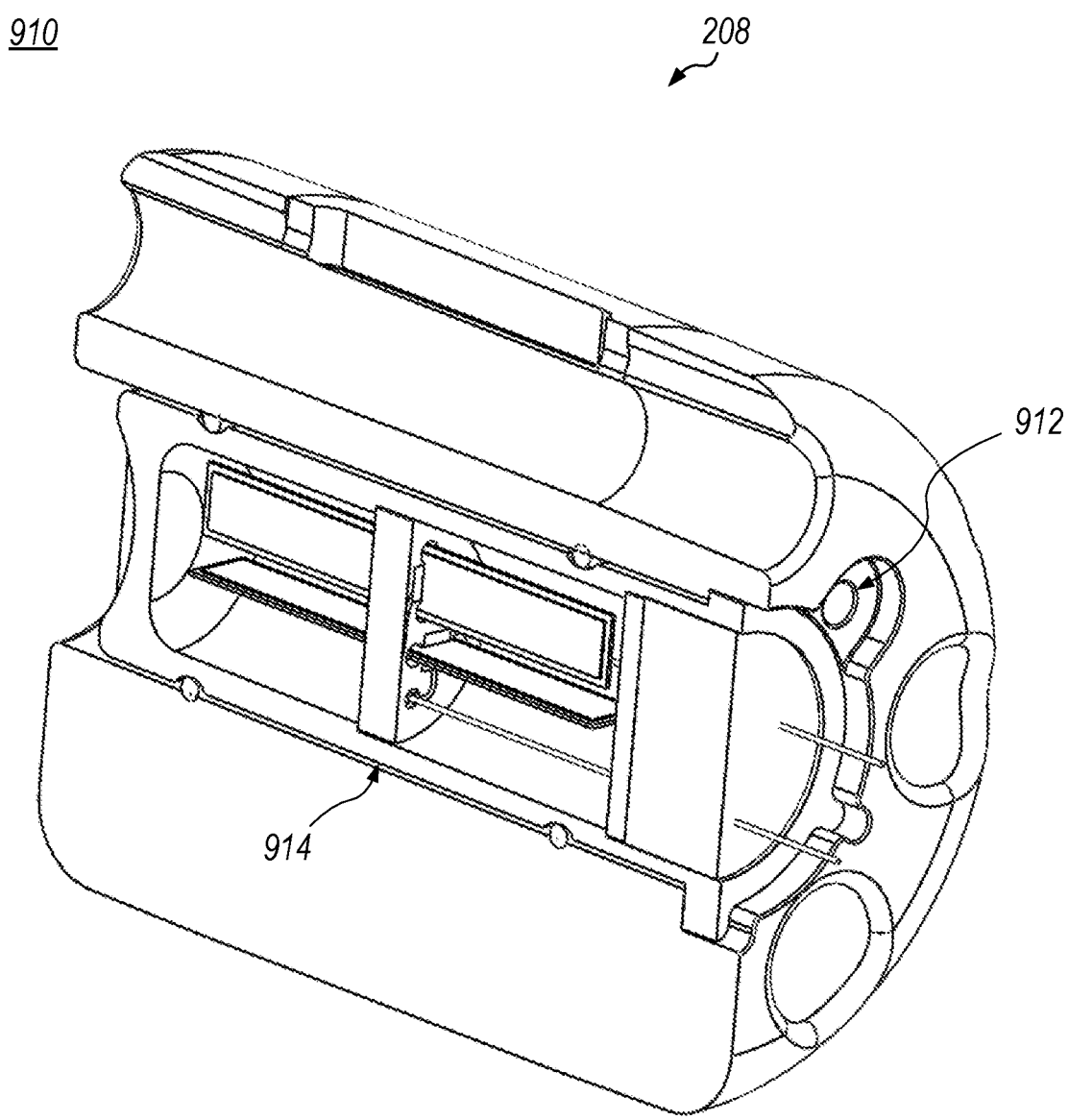

Referring now to FIG. 9B, block diagram 910 depicts a perspective, cross-sectional view of the sensor assembly 208 in which the sensor housing 204 is mounted within the cavity 902. As noted above with reference to FIG. 6A, the external surface of the housing body 602 may include one or more grooves 604 that are configured to receive O rings 214 such that, when the sensor housing 204 is inserted within the cavity 902 of the spacer carrier 206, the sensor housing 204 is centrally aligned within, yet not in direct physical contact with, the spacer carrier 206. During assembly of the sensor assembly 208, prior to positioning the sensor housing 204 within the cavity 902, the O rings 214 may be mounted within the grooves 604 on the external surface of the housing body 602. Once the O rings 214 are in position, the sensor housing 204 may be inserted into the cavity 902 such that the sensor housing 204 is supported, on an inner wall of the cavity 902, by the O rings 214 and the housing body 602 of the sensor housing 204 is not in direct physical contact with the inner wall the cavity 902. For example, as shown in FIG. 9B, when the sensor housing 204 is inserted within the cavity 902, a small gap 914 exist between the inside surface of the spacer carrier 206 and the exterior surface of the sensor housing 204. In various embodiments, this gap 914 provides a small "deformation buffer" such that, if the sensor assembly 208 is subjected to a crush load, that force is not transferred to the sensor (e.g., the two-axis sensing element 202) contained therein. In various embodiments, the O rings 214 and their structural equivalents may be referred to as a "third means for creating a physical gap between an inner surface of the cavity through the body of the spacer carrier and an external surface of a housing body of the sensor housing when the sensor housing is inserted into the cavity."

Once it is positioned within the cavity 902, the sensor housing 204 may be affixed in that position. For example, in the depicted embodiment, spacer carrier 206 includes a blind-hole 912 located at the mouth 905 of, and parallel to, the cavity 902. In various embodiments, the blind-hole 912 is configured to receive a retention screw to retain the sensor housing 204 within the cavity 902 of the body of the spacer carrier 206. For example, the sensor housing 204 may be retained within the spacer carrier 206 through interference with the head of a suitable fastening element (e.g., screw, pin, etc.) that is inserted into the blind-hole 912. In various embodiments, after the sensor housing 204 (and, therefore, the two-axis sensing element 202) has been affixed within the cavity 902 of the spacer carrier 206, the sensor assembly 208 may be deployed within a seismic streamer 20 for use in a seismic survey. Note, however, that the sensor housing 204 may be affixed within the cavity 902 through other suitable retention techniques. For example, some embodiments may utilize a post and barbed fastener configured to retain the sensor housing 204 within the cavity 902. In other embodiments, sensor housing 204 may be affixed within the cavity 902 through use of a C-clip or other suitable fastening element.

Turning now to FIG. 10, a flow diagram illustrating an example method 1000 of manufacturing a sensor assembly is depicted, according to some embodiments. In various embodiments, method 1000 may be used to create sensor assembly 208 of FIG. 2. In FIG. 10, method 1000 includes elements 1002-1008. While these elements are shown in a particular order for ease of understanding, other orders may be used. In various embodiments, some of the method elements may be performed concurrently, in a different order than shown, or may be omitted. Additional method elements may also be performed as desired.

At 1002, in the illustrated embodiment, method 1000 includes aligning a first orientation of a sensor relative to a first alignment element 606 on a sensor housing 204, where the sensor housing 204 includes a housing body 602 configured to receive the sensor. For example, in various embodiments, two-axis sensing element 202 may be mounted within the housing body 602 of sensor housing 204. In such embodiments, element 1002 may include aligning the orientation of the two-axis sensing element 202 to the alignment element 606 of the sensor housing 204. In various embodiments, the first alignment element 606 may include one or more raised nodes 612 along the periphery of a first end of the sensor housing 204.

At 1004, in the illustrated embodiment, method 1000 includes mounting the sensor on a first annular step 702 within the housing body 602 of the sensor housing 204 such that the sensor and the sensor housing 204 maintain the first orientation. In some embodiments, method 1000 may further include mounting a capping element on a second annular step 704 within the housing body 602 of the sensor housing 204 where the second annular step 704 is positioned at a first distance from the mouth 605 of the sensor housing 204 such that there is a void between a first surface of the capping element and the mouth 605 of the sensor housing 204. For example, as described above with reference to FIG. 7A, capping element 210 may be mounted to the annular step 704 along the inner wall of the housing body 602. Further, in some embodiments, method 1000 may include filling the void between the first surface of the capping element and the mouth 605 of the sensor housing 204 with a potting compound to create a watertight seal of the sensor within the sensor housing 204.

At 1006, in the illustrated embodiment, method 1000 includes positioning the sensor housing 204 within a cavity in a body of a spacer carrier 206. In various embodiments, the spacer carrier 206 is configured to be deployed within a seismic streamer. In various embodiments, the spacer carrier 206 includes a second alignment element 904 that is configured to interface with the first alignment element 606 on the sensor housing 204 to maintain a second orientation of the sensor housing 204 relative to the spacer carrier 206. In some embodiments, the second alignment element 904 may include one or more depressions configured to receive the one or more raised nodes 612 along the periphery of the first end of the sensor housing 204. Further, in various embodiments, element 1006 may include inserting the sensor housing 204 into the cavity 902 such that the sensor housing 204 is supported, on an inner wall of the cavity 902, by the one or more O rings 214 and the housing body 602 of the sensor housing 204 is not in direct physical contact with an inner wall of the cavity 902.

At 1008, in the illustrated embodiment, method 1000 includes affixing the sensor housing 204 within the cavity 902 of the spacer carrier 206. As noted above, in some embodiments, sensor housing 204 may be affixed within the spacer carrier 206 using a retention screw through the blind-hole 912 in the spacer carrier 206. As noted above, in some embodiments, one or more O rings 214 may be mounted on the exterior surface of the housing body 602 of the sensor housing 204. In such embodiments, method 1000 may further include mounting one or more O rings 214 within one or more grooves 604 on an external surface of the housing body 602 prior to positioning the sensor housing 204 within the cavity 902. In various embodiments, subsequent to affixing the sensor housing 204 within the cavity 902 of the spacer carrier, the sensor assembly 208 may be deployed within a seismic streamer for use in a seismic survey.

Turning now to FIG. 11, a flow diagram illustrating an example method 1100 for detecting particle motion is depicted, according to some embodiments. In various embodiments, method 1100 may be performed by two-axis sensing element 202 of FIG. 3 to detect particle motion. As noted above, in various embodiments, two-axis sensing element 202 is configured to detect linear fluid particle acceleration associated with acoustic waves. Further, in various embodiments, the two-axis sensing element 202 is configured to cancel noise that may otherwise be induced by rotational acceleration of the two-axis sensing element 202 as it is detecting particle motion associated with the acoustic waves. In various embodiments, method 1100 may be performed in the context of a geophysical survey. For example, in some embodiments, two-axis sensing element 202 may be deployed within a towed seismic streamer and method 1100 may be performed by sensing element 202 to detect particle motion received at the streamer during a seismic survey. In other embodiments, two-axis sensing element 202 may be deployed as an ocean-bottom sensor within, for example, an ocean-bottom node or ocean-bottom cable. For example, in some embodiments, two-axis sensing element 202 may be used in the context of hazard monitoring for oil reservoirs. In some such embodiments, two-axis sensing elements 202 may be deployed (along with hydrophones or other sensors 22) as ocean-bottom sensors (e.g., within an ocean-bottom node or cable) and used to detect micro-seismic events that occur as a precursor to a breach of the geology situated above hydrocarbon-bearing geological formations. Note that, in various embodiments, two-axis sensing element 202 may be used in either on-shore or off-shore operations to detect particle motion. Further note that, in various embodiments, two-axis sensing element 202 may be used in contexts outside of geophysics and seismic surveying. As one non-limiting example, in some embodiments, the two-axis sensing element 202 may be used in ranging applications, such as sonar.

In FIG. 11, method 1100 includes elements 1102-1110. While these elements are shown in a particular order for ease of understanding, other orders may be used. In various embodiments, some of the method elements may be performed concurrently, in a different order than shown, or may be omitted. Additional method elements may also be performed as desired.

At 1102, in the illustrated embodiment, method 1100 includes detecting, by a particle motion sensing element, particle motion, where the detecting is performed during a time interval in which the particle motion sensing element experiences a rotational acceleration. In various embodiments, the particle motion sensing element may be the two-axis sensing element 202 described in detail above. For example, as described above with reference to FIG. 3B, in some embodiments, both of the pair of bender elements may be "bimorphs" that include a substrate element and a first piezoelectric element attached to a first side of the substrate element. In other embodiments, however, both of the pair of bender elements may be "trimorphs" that also include a second piezoelectric element attached to a second, opposite side of the substrate element. In various embodiments, the particle motion sensing element may include a mounting plate that includes a first pair of mounting slots oriented in a first direction. In such embodiments, the first pair of bender elements may be mounted through the first pair of mounting slots such that the first pair of bender elements is oriented in the first direction. Further note that, in various embodiments, the particle motion sensing element may include a second pair of bender elements mounted through a second pair of mounting slots, in the mounting plate, such that the second pair of bender elements is oriented in a second, different direction. In various embodiments, the first and second pairs of bender elements may be mounted to the mounting plate such that there is an orthogonal alignment between the first pair of bender elements, the second pair of bender elements, and the mounting plate. Note, however, that in some embodiments, the mounting slots 332 may be oriented such that the pairs of bender elements 302 (when mounted within the mounting slots 332) are not positioned perpendicular to one another. Instead, in such embodiments, the mounting slots 332 may be offset by some desired amount (e.g., one degree, five degrees, ten degrees, or any other desired offset) such that the first pair of bender elements 302A and 302B are not perpendicular to the second pair of bender elements 302C and 302D.

In some such embodiments, the mounting plate may transect each of the first and second pairs of bender elements into two cantilever portions 308. Note that, in various embodiments, the mounting plate 304 may transect each of the first and second pair of bender elements 302 such that the cantilever portions 308 are of the same or substantially the same length. For example, in some embodiments, the lengths of the cantilever portions 308 for a given bender element may be within a 5%, 10%, 15%, etc. tolerance of each other. In other embodiments, however, the two-axis sensing element 202 may be configured such that the mounting plate 304 transects one or more of the bender elements 302 into two cantilever portions 308 that are not the same or substantially the same length. That is, in some embodiments, there may be an asymmetry between the lengths of the cantilever portions 308 in one or more of the bender elements 302 in a two-axis sensing element 202, according to some embodiments.

As described above with reference to FIG. 4A, in some embodiments, each of the bender elements may be a "series-type" bender element in which the piezoelectric elements of the bender element are connected in series. For example, in some such embodiments, both of the pair of bender elements are arranged such that negative electrodes of the first and second piezoelectric elements are attached to opposing sides of the substrate element. In other embodiments, however, each of the bender elements may be a "parallel-type" bender element in which the piezoelectric elements of the bender element are connected in parallel, as described above with reference to FIG. 4C. For example, in some such embodiments, both bender elements in the pair of bender elements are arranged such that a negative electrode of the first piezoelectric element is attached to the first side of the substrate element and the positive electrode of the second piezoelectric element is attached to the second, opposite side of the substrate element. Further, as described above with reference to FIGS. 4E-4H, the individual bender elements within a pair of bender elements may be connected to one another either in parallel or in series, according to various embodiments. For example, in some embodiments of method 1100, the pair of bender elements are connected to one another in parallel. In other embodiments, however, the pair of bender elements are connected to one another in series. Note that, in various embodiment, the mounting plate may include conducting traces on both a front and back side such that the first pair of bender elements may be connected to each other via one or more of the conducting traces and the second pair of bender elements may be connected to each other via one or more of the conducting traces.

In some embodiments, element 1102 of method 1100 may include the operations indicated in elements 1104-1110. At 1104, in the illustrated embodiment, method 1100 includes receiving, from a first bender element, a first signal based on a flexing of the first bender element in a first direction. In various embodiments, this flexing of the first bender element may be induced by the rotational acceleration. For example, as described above with reference to FIGS. 5A-5B, bender element 302A may generate a first signal based on a flexing of the bender element 302A, induced by rotational acceleration of the two-axis sensing element 202, in a first direction. At 1106, in the illustrated embodiment, method 1100 includes receiving, from a second bender element, a second signal based on a flexing of the second bender element in a second direction opposite of the first direction. In various embodiments, the flexing of the second bender element may be induced by the rotational acceleration. For example, with continued reference to FIGS. 5A-5B, bender element 302B may generate a second signal based on a flexing of the bender element 302B in a second opposite direction, where the flexing of the bender element 302B is induced by rotational acceleration of the two-axis sensing element 202. That is, in response to a rotational acceleration about a longitudinal axis of the particle motion sensing element, the first and second bender elements may generate opposite, complimentary charges. At 1108, in the illustrated embodiment, method 1100 includes combining first and second signals such that at least a portion of the first and second signals cancel, thereby reducing noise due to the rotational acceleration of the sensing element 202. At 1110, in the illustrated embodiment, method 1100 includes recording signals indicative the particle motion detected by the particle motion sensing element. In some embodiments, at 1110, the recording includes storing the signals indicative of the particle motion on one or more non-transitory, computer-readable storage media, thereby completing the manufacture of a geophysical data product.

In some embodiments, a geophysical data product may be manufactured according to techniques described in this disclosure. A geophysical data product may comprise a computer-readable, non-transitory medium having geophysical data stored on the medium, including, e.g., raw streamer data, processed streamer data, two- or three-dimensional maps based on streamer data, or other suitable representations. Some non-limiting examples of computer-readable media may include tape reels, hard drives, CDs, DVDs, flash memory, print-outs, etc., although any tangible computer-readable medium may be employed to create the geophysical data product. In some embodiments, raw analog data from streamers may be stored in the geophysical data product. In other instances, as noted above, the data may first be digitized or conditioned prior to being stored in the geophysical data product. In yet other instances, the data may be fully processed into a two- or three-dimensional map of the various geophysical structures, or another suitable representation, before being stored in the geophysical data product. The geophysical data product may be manufactured during the course of a survey (e.g., by equipment on a vessel) and then, in some instances, transferred to another location for geophysical analysis, although analysis of the geophysical data product may occur contemporaneously with survey data collection. In other instances, the geophysical data product may be manufactured (or remanufactured) subsequent to survey completion, e.g., during the course of analysis of the survey.

Example Computing Device

Figure 12:
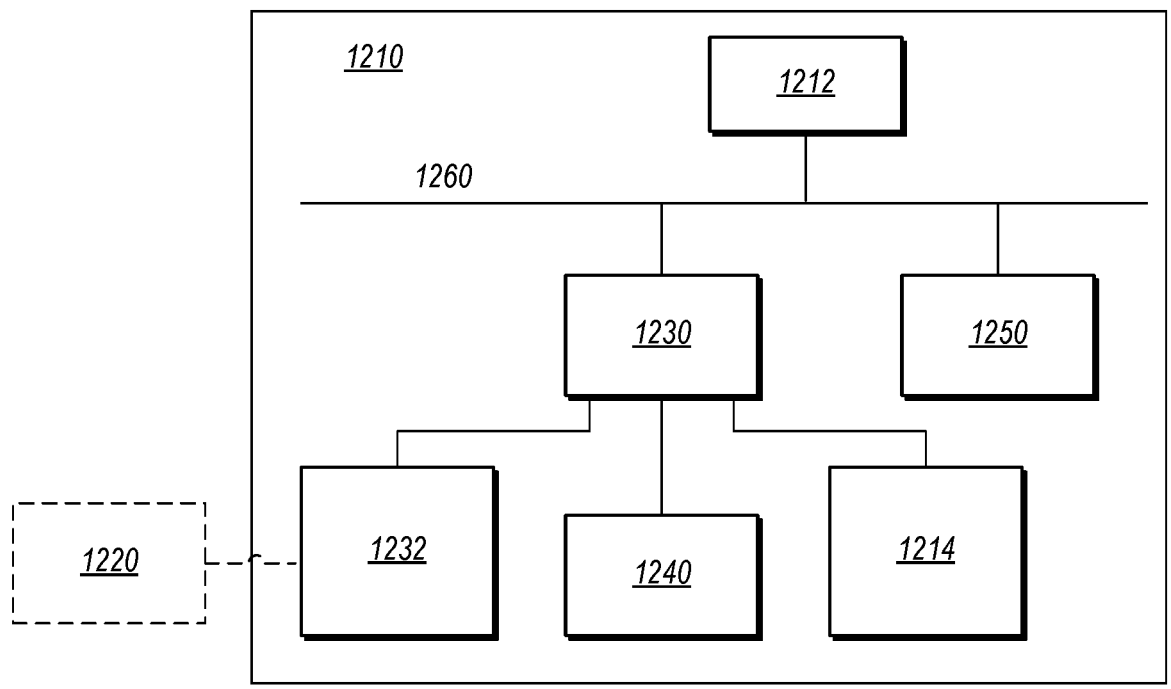
FIG. 12 is a block diagram illustrating an example computing device, according to some embodiments.

Turning now to FIG. 12, a block diagram of a computing device 1210 (which may also be referred to as a computing system) is depicted, according to some embodiments. Computing device 1210 may be used to implement various portions of this disclosure. For example, computing device 1210 may be used to manufacture a geophysical data product during a survey conducted using disclosed embodiments. Computing device 1210 is one example of a device that may be used as a mobile device, a server computing system, control equipment, a client computing system, or any other computing system implementing portions of this disclosure.

Computing device 1210 may be any suitable type of device, including, but not limited to, a personal computer system, desktop computer, laptop or notebook computer, mobile phone, mainframe computer system, web server, workstation, or network computer. As shown, computing device 1210 includes processing unit 1250, storage subsystem 1212, and input/output (I/O) interface 1230 coupled via interconnect 1260 (e.g., a system bus). I/O interface 1230 may be coupled to one or more I/O devices 1240. I/O interface 1230 may also be coupled to network interface 1232, which may be coupled to network 1220 for communications with, for example, other computing devices. I/O interface 1230 may also be coupled to computer-readable medium 1214, which may store various survey data such as sensor measurements, survey control parameters, etc.

As described above, processing unit 1250 includes one or more processors. In some embodiments, processing unit 1250 includes one or more coprocessor units. In some embodiments, multiple instances of processing unit 1250 may be coupled to interconnect 1260. Processing unit 1250 (or each processor within processing unit 1250) may contain a cache or other form of on-board memory. In some embodiments, processing unit 1250 may be implemented as a general-purpose processing unit, and in other embodiments it may be implemented as a special purpose processing unit (e.g., an ASIC). In general, computing device 1210 is not limited to any particular type of processing unit or processor subsystem.

Storage subsystem 1212 is usable by processing unit 1250 (e.g., to store instructions executable by and data used by processing unit 1250). Storage subsystem 1212 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 1212 may consist solely of volatile memory in some embodiments. Storage subsystem 1212 may store program instructions executable by computing device 1210 using processing unit 1250, including program instructions executable to cause computing device 1210 to implement the various techniques disclosed herein. In at least some embodiments, storage subsystem 1212 may represent an example of a non-transitory computer-readable medium that may store executable instructions.

In the illustrated embodiment, computing device 1210 further includes non-transitory medium 1214 as a possibly distinct element from storage subsystem 1212. For example, non-transitory medium 1214 may include persistent, tangible storage such as disk, nonvolatile memory, tape, optical media, holographic media, or other suitable types of storage. In some embodiments, non-transitory medium 1214 may be employed to store and transfer geophysical data and may be physically separable from computing device 1210 to facilitate transport. Accordingly, in some embodiments, the geophysical data product discussed above may be embodied in non-transitory medium 1214. Although shown to be distinct from storage subsystem 1212, in some embodiments, non-transitory medium 1214 may be integrated within storage subsystem 1212.

I/O interface 1230 may represent one or more interfaces and may be any of various types of interfaces configured to couple to and communicate with other devices, according to various embodiments. In some embodiments, I/O interface 1230 is a bridge chip from a front-side to one or more back-side buses. I/O interface 1230 may be coupled to one or more I/O devices 1240 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.). In some embodiments, the geophysical data product discussed above may be embodied within one or more of I/O devices 1240.

What is claimed is:

1. An apparatus, comprising:
   a spacer carrier configured to be deployed within a seismic streamer, wherein the spacer carrier provides a cavity through a body of the spacer carrier, and wherein the spacer carrier includes a first alignment element positioned at a first end of the cavity; and
   a sensor housing configured to be deployed within the cavity through the body of the spacer carrier, wherein the sensor housing includes:
     a housing body; and
     a second alignment element configured to interface with the first alignment element; and
   a mounting plate configured to be fixed within the housing body such that the mounting plate is orthogonal to a longitudinal axis of the sensor housing;
   wherein the mounting plate comprises a first pair of mounting slots configured to receive a first pair of sensor elements such that each of the first pair of sensor elements protrudes from the mounting plate on opposite sides thereof; and
   wherein the first and second alignment elements are configured to maintain an orientation of the sensor housing within the cavity when the sensor housing is inserted into the spacer carrier.

2. The apparatus of claim 1, wherein the second alignment element includes one or more raised nodes on a periphery of a mouth of the sensor housing; wherein the first alignment element includes one or more corresponding depressions in the body of the spacer carrier configured to receive the one or more raised nodes.

3. The apparatus of claim 1, wherein the sensor housing includes a first annular step along an inner wall of the housing body that is dimensioned to receive a mounting plate of the sensor.

4. The apparatus of claim 3, wherein the sensor housing includes a second annular step along the inner wall of the housing body, wherein the first annular step is positioned at a first distance from a mouth of the sensor housing, and wherein the second annular step is positioned at a second, shorter distance from the mouth of the sensor housing.

5. The apparatus of claim 4, further comprising:
a connective plate that includes one or more holes configured to receive one or more connecting wires from the sensor, wherein the connective plate is configured to be mounted, within the sensor housing, on the second annular step.

6. The apparatus of claim 4, further comprising:
a cap configured to be mounted, within the sensor housing, on the second annular step, wherein the cap includes one or more passageways through which one or more corresponding wires are routed from the sensor through a mouth of the sensor housing.

7. The apparatus of claim 1, wherein the spacer carrier is constructed from glass-filled polypropylene.

8. The apparatus of claim 1, wherein:
the first pair of mounting slots are positioned parallel to, and offset from, a first axis extending in a first direction through a center of the mounting plate.

9. The apparatus of claim 8, wherein:
the mounting plate further comprises a second pair of mounting slots configured to receive a second pair of sensor elements such that each of the second pair of sensor elements protrudes from the mounting plate on opposite sides thereof; and
the second pair of mounting slots are positioned parallel to, and offset from, a second axis extending in a second direction through the center of the mounting plate, wherein the second direction is different than the first direction.

10. The apparatus of claim 9, wherein:
the second direction is perpendicular to the first direction.

11. An apparatus, comprising:
a spacer carrier configured to be deployed within a seismic streamer, wherein the spacer carrier provides a cavity through a body of the spacer carrier, and wherein the spacer carrier includes a first alignment element positioned at a first end of the cavity; and
a sensor housing situated within the cavity through the body of the spacer carrier, wherein the sensor housing includes:
a housing body in which a mounting plate is fixed such that the mounting plate is orthogonal to a longitudinal axis of the sensor housing; and
a second alignment element configured to interface with the first alignment element;
wherein the mounting plate comprises a first pair of mounting slots in which a first pair of sensor elements are mounted such that each of the first pair of sensor elements protrudes from the mounting plate on opposite sides thereof; and
wherein the first and second alignment elements are configured to maintain an orientation of the sensor housing within the cavity.

12. The apparatus of claim 11, wherein an external surface of the housing body is tapered from a first diameter at the first end of the sensor housing to a second, smaller diameter at a second end of the sensor housing.

13. The apparatus of claim 11, wherein an external surface of the housing body includes a plurality of grooves configured to receive a plurality of O-rings.

14. The apparatus of claim 13, wherein the sensor housing is situated within the cavity of the spacer carrier such that the sensor housing is supported, on an inner wall of the cavity, by the plurality of O-rings such that the housing body of the sensor housing is not in direct physical contact with the inner wall of the cavity.

15. The apparatus of claim 11, wherein the cavity is a tapered through hole located at a center of a longitudinal axis through the body of the spacer carrier.

16. The apparatus of claim 11, wherein the spacer carrier includes a blind hole, parallel to the cavity, that is configured to receive a retention screw to retain the sensor housing within the cavity.

17. The apparatus of claim 11, wherein the sensor is a particle motion sensing element.

18. The apparatus of claim 11, wherein:
the first pair of mounting slots are positioned parallel to, and offset from, a first axis extending in a first direction through a center of the mounting plate.

19. The apparatus of claim 18, wherein:
the mounting plate further comprises a second pair of mounting slots in which a second pair of sensor elements are mounted such that each of the second pair of sensor elements protrudes from the mounting plate on opposite sides thereof; and
the second pair of mounting slots are positioned parallel to, and offset from, a second axis extending in a second direction through the center of the mounting plate, wherein the second direction is different than the first direction.

20. The apparatus of claim 19, wherein:
the second direction is perpendicular to the first direction.

21. An apparatus, comprising:
a spacer carrier that provides a cavity through a body of the spacer carrier, wherein the spacer carrier includes a first means for aligning an orientation of a sensor housing within the cavity when the sensor housing is inserted into the cavity; and
the sensor housing situated within the cavity, wherein the sensor housing includes:
a housing body;
a second means for interfacing with the first means to align the orientation of the sensor housing within the cavity; and
a mounting plate fixed within the housing body such that the mounting plate is orthogonal to a longitudinal axis of the sensor housing;
wherein the mounting plate comprises a first pair of mounting slots configured to receive a first pair of sensor elements such that each of the first pair of sensor elements protrudes from the mounting plate on opposite sides thereof.

22. The apparatus of claim 21, further comprising:
a third means for creating a physical gap between an inner surface of the cavity through the body of the spacer carrier and an external surface of a housing body of the sensor housing when the sensor housing is inserted into the cavity.

23. The apparatus of claim 21, wherein:
the first pair of mounting slots are positioned parallel to, and offset from, a first axis extending in a first direction through a center of the mounting plate.

24. The apparatus of claim 23, wherein:
the mounting plate further comprises a second pair of mounting slots configured to receive a second pair of sensor elements such that each of the second pair of sensor elements protrudes from the mounting plate on opposite sides thereof; and
the second pair of mounting slots are positioned parallel to, and offset from, a second axis extending in a second direction through the center of the mounting plate, wherein the second direction is different than the first direction.

25. The apparatus of claim 24, wherein:
the second direction is perpendicular to the first direction.

* * * * *